United States Patent [19]

Cowell et al.

[11] 4,077,948

[45] *Mar. 7, 1978

[54] METAL DEACTIVATORS AS ADHESION PROMOTORS FOR VULCANIZABLE ELASTOMERS TO METALS

[75] Inventors: George K. Cowell, Loveland, Ohio; David J. Cherry, Somers, N.Y.

[73] Assignee: Ciba-Geigy Corporation, Ardsley, N.Y.

[*] Notice: The portion of the term of this patent subsequent to Sep. 23, 1992, has been disclaimed.

[21] Appl. No.: 674,479

[22] Filed: Apr. 7, 1976

Related U.S. Application Data

[60] Continuation-in-part of Ser. No. 600,240, Jul. 30, 1975, Pat. No. 3,994,987, which is a division of Ser. No. 404,972, Oct. 10, 1973, Pat. No. 3,907,925.

[51] Int. Cl.$^2$ .............................................. B29H 5/02
[52] U.S. Cl. ........................ 260/79.5 R; 156/110 A; 156/124; 156/327; 156/338; 260/79.5 P; 260/791; 428/457; 428/462; 428/465
[58] Field of Search ............ 260/791, 79.5 R, 79.5 P; 150/110 A, 124, 327, 338; 428/457, 462, 465

[56] References Cited

U.S. PATENT DOCUMENTS

| | | | |
|---|---|---|---|
| 2,018,645 | 10/1935 | Williams et al. | 260/45.9 R |
| 2,912,355 | 11/1959 | Formanek et al. | 156/110 A |
| 3,052,580 | 9/1962 | Miller et al. | 152/359 |
| 3,110,696 | 11/1963 | Dexter | 260/45.9 NC |
| 3,357,944 | 12/1967 | Dexter | 260/45.9 NC |
| 3,517,722 | 6/1970 | Endter et al. | 152/359 |
| 3,596,696 | 8/1971 | Freytag et al. | 152/359 |
| 3,660,438 | 5/1972 | Dexter | 260/45.9 NC |
| 3,734,885 | 5/1973 | Muller et al. | 260/45.9 NC |
| 3,773,830 | 11/1973 | Dexter | 260/45.9 NC |
| 3,907,925 | 9/1975 | Cowell et al. | 260/791 |

*Primary Examiner*—Ronald W. Griffin
*Attorney, Agent, or Firm*—Nestor W. Shust

[57] ABSTRACT

Adhesion of metals to vulcanizable elastomers is promoted by a process of incorporating into the elastomer a metal deactivator and then vulcanizing the elastomeric composition while it is in contact with the metal surface.

6 Claims, No Drawings

METAL DEACTIVATORS AS ADHESION PROMOTORS FOR VULCANIZABLE ELASTOMERS TO METALS

This is a Continuation-in-Part of application Ser. No. 600,240 filed on July 30, 1975, now U.S. Pat. No. 3,994,987, which is a Divisional of application Ser. No. 404,972 filed on Oct. 10, 1973, now U.S. Pat. No. 3,907,925.

This invention relates to the bonding of vulcanizable elastomeric compositions to metals.

In the production of rubber articles, such as, for example, pneumatic tires, belts, conveyor belts provided with reinforcing metallic elements, tubes provided with reinforcing cords or wires, and, in general, in the production of all rubber articles in which rubber is reinforced with metal, it is necessary to obtain between the metal and the elastomeric composition a strong and durable bond in order to ensure a good efficiency and a long life for the articles produced.

It has now been unexpectedly found that unusually good bonds are produced between vulcanizable elastomeric compositions and metals where there is added to the vulcanizable elastomeric composition a compound with metal deactivating activity, and the compositions are then vulcanized while in contact with the metal. Compounds of particular suitability within this broad definition are found to have at least two nitrogen atoms directly bonded to each other, the remaining valence requirements of each nitrogen atom being fulfilled through bonding to hydrogen or to an organic residue. Hydrazine derivatives are thus especially suitable compounds. It appears that the activity of these compounds in adhesion promotion may be attributable in great measure to the N-N atoms. Since the organic residue seems to be of secondary importance, it is felt that this invention may embrace practically all —N—N— containing compounds with metal deactivating efficiency regardless of the specific organic residues involved.

Such —N—N— containing organic compounds are e.g. alkylated and/or arylated hydrazines, hydrazides of carboxylic acids and/or carbonic acid, hydrazones of aldehydes and ketones and heterocyclic ring systems, which can contain other heteroatoms than only the —N—N-group, e.g. oxygen or sulphur.

One class of metal deactivating compounds of this invention is represented by the generic formula

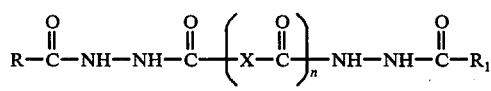

I wherein R and R' independently of each other represent alkyl having from 1 to 17 carbon atoms, cyclohexyl, aralkyl which can be substituted by one or two alkyl groups having each from 1 to 4 carbon atoms and/or a hydroxyl group, phenyl, chlorophenyl, dichlorophenyl, phenyl which can be substituted by one or two alkyl groups having each from 1 to 4 carbon atoms and/or a hydroxyl group, alkylphenyl having from 7 to 14 carbon atoms, alkoxyphenyl having from 7 to 24 carbon atoms or naphthyl, X represents the direct bond, an alkylene radical having from 1 to 8 carbon atoms, a phenylene radical or a naphthylene radical, —CH$_2$SCH$_2$—, or —CH$_2$CH$_2$SCH$_2$CH$_2$—, and $n$ represents 0 or 1.

The compounds of formula I are prepared according to procedures described in U.S. Pat. No. 3,734,885.

R and R', respectively, represent in Formula I, e.g., an alkyl group having from 1 to 17 carbon atoms, such as methyl, ethyl, propyl, butyl, pentyl, hexyl, isoheptyl, octyl, decyl, undecyl, dodecyl, tetradecyl, or heptadecyl; or an alkylphenyl group having from 7 to 14 carbon atoms such as, e.g., phenyl which is substituted by methyl, tert.-butyl or tert.-octyl groups; or an alkoxyphenyl group having from 7 to 24, especially 8 to 18 carbon atoms such as, e.g., phenyl which is substituted by methoxy, propoxy, butoxy, hexoxy, octoxy, decyloxy, dodecyloxy, tetradecyloxy or octadecyloxy.

Examples of aralkyl or phenyl radicals represented by R and R', respectively, which radicals can be substituted by one or two alkyl groups having each from 1 to 4 carbon atoms and/or a hydroxyl group are: the 4-hydroxy-2-phenylethyl, 4-hydroxyphenyl, 3-tert.-butyl-4-hydroxy-β-phenylethyl, 3-methyl-4-hydroxyphenyl, 2-hydroxy-3,5-di-tert.-butylphenyl and 3,5-di-isopropyl-4-hydroxy-β-phenylethyl radical, more especially, however, the 3,5-di-tert.-butyl-4-hydroxy-β-phenylethyl and 3,5-di-tert.-butyl-4-hydroxyphenyl radical.

When X in Formula I represents an alkylene radical having from 1 to 8 carbon atoms, this can be, e.g. methylene, ethylene, propylene, butylene, pentylene, hexylene or octylene. X however can also represent a phenylene radical such as the 1,3- or 1,4-phenylene radical, or a naphthylene radical such as the 2,6- or 1,4-naphthylene radical.

The most preferred compounds of Formula I are those wherein R and R' are identical. Particularly valuable compounds of Formula I are those wherein R and R' are identical, X is the direct bond or methylene or $n$ is 0.

Preferred asymmetrical compounds of Formula I are those wherein R and R' independently of each other represent alkyl having from 1 to 17 carbon atoms, cyclohexyl, benzyl, 3,5-di-tert.-butyl-4-hydroxy-β-phenylethyl, 3,5-di-tert.-butyl-4-hydroxyphenyl, phenyl, chlorophenyl, dichlorophenyl, alkylphenyl having 7 or 8 carbon atoms, alkoxyphenyl having 7 or 8 carbon atoms or naphthyl, and X represents the direct bond or $n$ is 0.

Preferred symmetrical compounds of Formula I are compounds in which R and R' are identical and each represents alkyl having from 1 to 17 carbon atoms, cyclohexyl, benzyl, hydroxy-β-phenylethyl or hydroxyphenyl di-substituted by alkyl having from 1 to 4 carbon atoms, phenyl, chlorophenyl, dichlorophenyl, alkylphenyl having from 7 to 12 carbon atoms, alkoxyphenyl having from 7 to 12 carbon atoms or naphthyl, and X represents the direct bond or $n$ is 0.

A second preferred group of symmetrical compounds usable according to the invention are the compounds in which R and R' are identical and each represents alkyl having from 1 to 17 carbon atoms, cyclohexyl, benzyl, hydroxy-β-phenylethyl or hydroxyphenyl di-substituted by alkyl having from 1 to 4 carbon atoms, phenyl, chlorophenyl, dichlorophenyl, alkylphenyl having from 7 to 12 carbon atoms, alkoxyphenyl having from 7 to 12 carbon atoms or naphthyl, and X represents an alkylene radical having from 1 to 8 carbon atoms.

A third preferred group of symmetrical compounds of Formula I are the compounds in which R and R' are identical and each represents alkyl having from 1 to 17 carbon atoms, cyclohexyl, benzyl, hydroxy-β-phenylethyl or hydroxyphenyl di-substituted by alkyl having from 1 to 4 carbon atoms, phenyl, chlorophenyl, dichlorophenyl, alkylphenyl having from 7 to 14 carbon atoms, alkoxyphenyl having from 7 to 18 carbon atoms, or naphthyl, and X represents phenylene or naphthylene.

Illustrative of the compounds of Formula I usable in the present invention are the following compounds:

N,N'-di-acetyl-carbonic acid dihydrazide
N,N'-di-propionyloxalic acid dihydrazide
N,N'-di-butyroyloxalic acid dihydrazide
N,N'-di-pelargonyloxalic acid dihydrazide
N,N'-di-cyclohexanoyloxalic acid dihydrazide
N,N'-di-phenylacetyloxalic acid dihydrazide
N,N'-di-benzoyloxalic acid dihydrazide
N,N'-di-α-naphthoyloxalic acid dihydrazide
N,N'-di-o-toluoyloxalic acid dihydrazide
N,N'-di-stearoyl-carbonic acid dihydrazide
N,N'-di-propionyloxalic acid dihydrazide
N,N'-di-p-methoxybenzoyloxalic acid dihydrazide
N,N'-di-caproyloxalic acid dihydrazide
N,N'-caproyloxalic acid dihydrazide
N,N'-di-acetylsuccinic acid dihydrazide
N,N'-di-acetyladipic acid dihydrazide
N,N'-di-propionyladipic acid dihydrazide
N,N'-acetylsebacic acid dihydrazide
N,N'-di-benzoylsebacic acid dihydrazide
N,N'-di-β-naphthoylsebacic acid dihydrazide
N,N'-di-propionylterephthalic acid dihydrazide
N,N'-pelargonylterephthalic acid dihydrazide
N,N'-di-2-ethylhexanoylterephthalic acid dihydrazide
N,N'-di-lauroylterephthalic acid dihydrazide
N,N'-di-stearoylterephthalic acid dihydrazide
N,N'-di-p-(tert.-octyl)-benzoylterephthalic acid dihydrazide
N,N'-di-p-(octoxy)-benzoylterephthalic acid dihydrazide
N,N'-di-tridecanoylterephthalic acid dihydrazide
N,N'-di-palmitoylterephthalic acid dihydrazide
N,N'-di-valeroylterephthalic acid dihydrazide
N,N'-di-butyroylisophthalic acid dihydrazide
N,N'-di-pelargonylisophthalic acid dihydrazide
N,N'-di-cyclohexanoylisophthalic acid dihydrazide
N,N'-di-2-chlorobenzoyloxalic acid dihydrazide
N,N'-bis-2,4-dichlorobenzoylsebacic acid dihydrazide
N-benzoyl-N'-butyroyloxalic acid dihydrazide
N-benzoyl-N'-pelargonyloxalic acid dihydrazide
N,N'-di-acetyloxalic acid dihydrazide
N,N'-di-acetylmalonic acid dihydrazide
N,N'-bis-(3,5-di-tert.-butyl-4-hydroxybenzoyl)-oxalic acid hydrazide, and
N,N'-bis-[3-(3,5-di-tert.-butyl-4-hydroxyphenyl)-propionyl]-adipic acid dihydrazide.
N,N'-di-stearoyloxalic acid dihydrazide A second class of metal deactivating compounds of this invention is represented by the generic formula

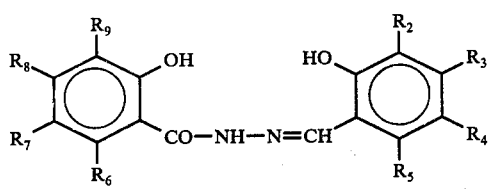

wherein $R_2$, $R_3$, $R_4$, $R_5$, $R_6$, $R_7$, $R_8$ and $R_9$ are each independently hydrogen, alkyl-, especially lower alkyl, e.g. containing 1 to 6 carbon atoms, e.g., methyl, ethyl, propyl, butyl, pentyl, hexyl-, alkoxy, especially lower alkoxy, containing 1 to 6 carbon atoms, e.g., methoxy, ethoxy, propoxy, butoxy, pentoxy, hexoxy-, a phenyl group, or a halogine, e.g. fluorine, chlorine.

The preferred compound of the Formula II is N-salicylidene-N'-salicylhydrazide of the Formula III

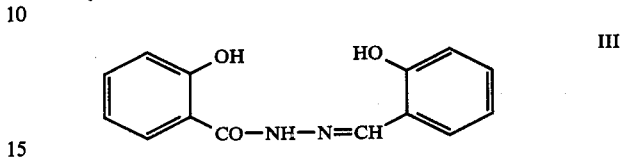

In the foregoing Formula II compounds are preferred wherein the R substituents are lower alkyl, lower alkoxy. The R groups may also be halogen e.g., fluroine, chlorine, etc. Where large, bulky substituents such as teriary alkyl groups occur, it is preferred not to have the same on adjacent carbon atoms of the aromatic ring. The R groups in compounds of the Formula II may be either primary, secondary or tertiary alkyl or alkoxy groups, such as propyl, isopropyl, propoxy, isopropoxy, butyl, isobutyl, tert.butyl, butoxy, isobutoxy, tert.-butoxy, etc.

The compounds of the Formula II at least in part, are known. For example, the compound of the Formula III is a known compound and is prepared according to known methods as described in U.S. Pat. No. 3,110,696.

Further examples are:
N-m-hexoxysalicylidene-N'-p-methoxysalicyloyl hydrazide
N-salicylidene-N'-o-methylsalicyloyl hydrazide
N-salicylidene-N'-o-sec-butyl-p-(1,1,5-trimethylhexyl) salicyloyl hydrazide A third class of metal deactivating compounds of this invention is represented by the generic formula

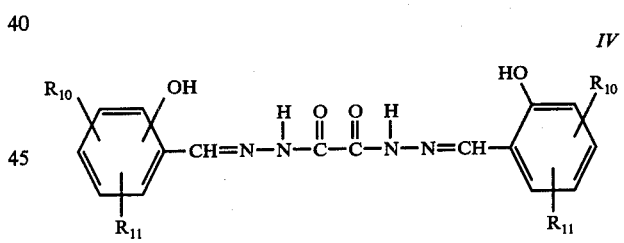

in which each of $R_{10}$ and $R_{11}$ is hydrogen, alkyl, chloro, phenyl or, taken together, benzo.

The preferred compounds are symmetrical. Preferably in the symmetrical compounds $R_{10}$ represents an alkyl group and $R_{11}$ hydrogene or $R_{10}$ and $R_{11}$ represents hydrogene.

Particularly valuable compounds embraced by Formula IV included compounds of the formula

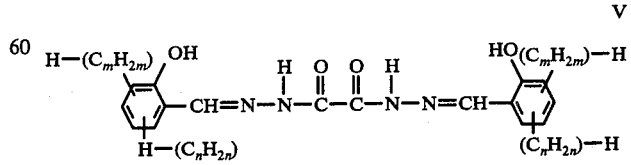

in which each of $n$ and $m$ is an integer from 0 to 20, especially from 0 to 6. This included are compounds of the following three formulae:

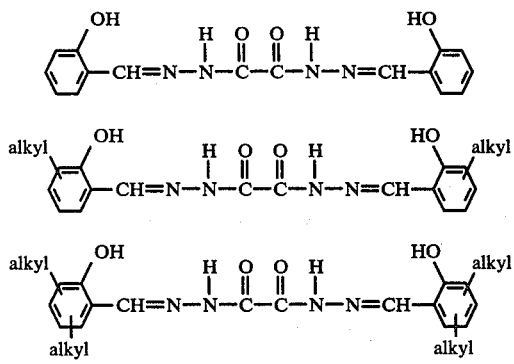

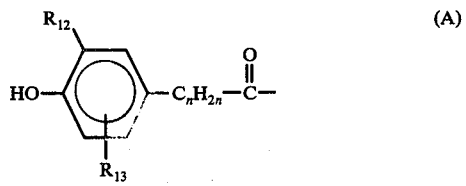

and n is an integer from 0 to 5.

Preferably $R_{13}$ in Formula IX is hydrogene or $R_{12}$ and $R_{13}$ are alkyl groups containing from 1 to 4 carbon atoms, $R_{14}$ represents hydrogene, an alkanoyl group containing 2 to 18 carbon atoms or a residue of Formula A and n denotes a value of 0 to 2. When $R_{14}$ represents a residue of Formula A, the symmetrical compounds are preferred.

By the term "alkyl" as used herein is intended a branched or straight chained hydrocarbon containing from one to 20 carbon atoms. Representative of such groups, without being limited thereby, are thus methyl, ethyl, propyl, t-butyl, pentyl, hexyl, octyl, t-octyl, decyl, tetradecyl, octadecyl, eicosyl and the like.

Illustrative examples of lower alkyl groups that are substituted on the phenyl moiety are methyl, ethyl, propyl, isopropyl, butyl, t-butyl, hexyl and the like. The preferred groups are the tertiary alkyls. Illustative examples of the higher alkyl groups are heptyl, octyl, decyl, dodecyl, tetradecyl, hexadecyl, octadecyl and the like, both straight chain and branched chain.

A preferred class of compounds of formula IV are those which are symmetrical, $R_{10}$ and $R_{11}$ represents hydrogene, an alkyl group having 1 to 6 carbon atoms, phenyl or chloro. A most preferred class of compounds of formula IV are those, which are symmetrical and wherein $R_{10}$ and $R_{11}$ represents hydrogene or one of the groups $R_{10}$ or $R_{11}$ represents methyl, chloro or phenyl.

The compounds of Formula IV are prepared according to procedures described in U.S. Pat. No. 3,357,944.

Illustrative of the compounds of Formula IV usable in the present invention are the following compounds:
 oxalo-bis-(2-hydroxy-benzylidene-hydrazide)
 oxalo-bis-(2-hydroxy-5-methylbenzylidene-hydrazide)
 oxalo-bis-(2-hydroxy-5-t-butylbenzylidene-hydrazide)
 oxalo-bis-(2-hydroxy-3,6-dimethylbenzylidene-hydrazide)
 oxalo-bis-(2-hydroxy-5-t-amylbenzyliden-heydrazide)
 oxalo-bis-(2-hydroxy-3,5-di-t-butylbenzylidenehydrazide)
 oxalo-bis-(2-hydroxy-5-phenylbenzylidenehydrazide)
 oxalo-bis-(2-hydroxy-5-chlorobenzylidenehydrazide)
 oxalo-bis-(2-hydroxy-1-naphthylidenehydrazide.

The compounds of Formula IX are prepared according to procedures described in U.S. Pat. No. 3,660,438.

Illustrative of the compounds of Formula IX usable in the present invention are the following compounds:
 β-(3,5-di-t-butyl-4-hydroxyphenyl)propionylhydrazide
 N,N'-bis-β-(3,5-di-t-butyl-4-hydroxyphenyl)-propionylhydrazine
 N-stearyl-N'-{β-(3,5-di-t-butyl-4-hydroxyphenyl)-propionyl}-hydrazine
 N-{β-(3-ethyl-4-t-butyl-4-hydroxyphenyl)-propionyl}-N'-β-(3,5-di-t-butyl-4-hydroxyphenyl) propionyl-hydrazine
 N-{β-(3,5-di-t-butyl-4-hydroxyphenyl)propionyl}-N'-(3,5-di-t-butyl-4-hydroxybenzoyl)-hydrazine
 β-(3,5-diisopropyl-4-hydroxyphenyl)propionylhydrazine
 N-stearoyl-N'-{β-(3,5-diisopropyl-4-hydroxyphenyl)-propionyl}-hydrazine
 N'-octanoyl-N-{β-(3-methyl-5-t-hexyl-4-hydroxyphenyl)-propionyl}-hydrazine.
 N,N'-(3,5-di-t-butyl-4-hydroxy-benzoyl)hydrazine
 N-acetyl-N'-[β-(3-t-butyl-4-hydroxyphenyl)propionyl] hydrazine.

A fourth class of metal deactivating compounds of this invention is represented by the generic formula:

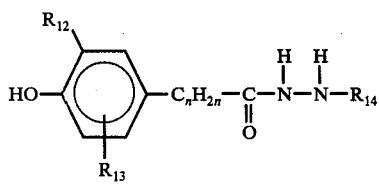

wherein $R_{12}$ is a lower alkyl group containing from 1 to 6 carbon atoms, $R_{13}$ is hydrogen or a lower alkyl group containing from 1 to 6 carbon atoms, and $R_{14}$ is hydrogen, an alkanoyl group containing 2 to 18 carbon atoms or a group represented by the formula A fifth class of metal deactivating compounds of this invention is represented by the generic formula

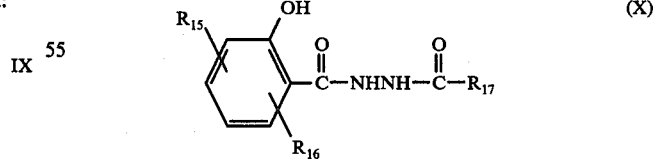

in which $R_{15}$ denotes hydrogen, alkyl with 1 to 8 carbon atoms, alkenyl with 3 L or 4 carbon atoms cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms, $R_{16}$ denotes hydrogen, alkyl with 1 to 5 carbon atoms, alkenyl with 3 or 4 carbon atoms, cyclohexyl, aralkyl with 7 to 9 carbon atoms, chlorine or hydroxyl, R$_{17}$ denotes alkyl with 1 to 21 carbon atoms, cyclohexyl or the radical (B)

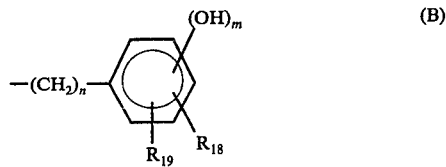

m denotes 0 or 1 and n denotes 0 to 2, the difference n–m being not less than 0 if the OH group is in the o-position to the —(CH$_2$)$_n$ group, and wherein R$_{18}$ denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms and R$_{19}$, if m is 1, denotes hydrogen, alkyl with 1 to 5 carbon atoms, alkenyl with 3 or 4 carbon atoms, cyclohexyl, aralkyl with 7 to 9 carbon atoms, chlorine or hydroxyl, or R$_{19}$, if m is 0, denotes hydrogen, alkyl with 1 to 8 carbon atoms, alkenyl with 3 or 4 carbon atoms, cycloalkyl with 6 to 8 carbon atoms, aralkyl with 7 to 9 carbon atoms, phenyl, chlorine, hydroxyl, alkoxy with 1 to 18 carbon atoms, acyloxy with 2 to 18 carbon atoms or acylamino with 2 to 18 carbon atoms.

Preferred compounds of the formula X are those in which R$_{15}$ denotes hydrogen, hydroxyl, chlorine, alkyl with 1 to 8 carbon atoms, alkoxy with 1 to 18 carbon atoms or acetoxy, R$_{16}$ denotes hydrogen, alkyl with 1 to 4 carbon atoms, especially butyl, or chlorine and R$_{17}$ denotes alkyl with 3 to 17 carbon atoms, cyclohexyl, benzyl or the radical

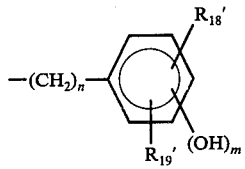

wherein m is 0 or 1, n is 0 to 2 and the difference n-m is not less than 0 if the OH group is in the o-position to the —(CH$_2$)$_n$— group, R$_{18}$' is hydrogen, hydroxyl, chlorine, alkyl with 1 to 4 carbon atoms, or alkoxy with 1 to 16 carbon atoms and R$_{19}$' is hydrogen, chlorine, alkyl with 1 to 4 carbon atoms, hexadecyloxy, acetylamino or o-hydroxybenzoylamino.

If R$_{15}$, R$_{16}$, R$_{17}$, R$_{18}$ and/or R$_{19}$ represents alkyl groups, these can, within the indicated limits, be methyl, ethyl, propyl, isopropyl, butyl, sec.-butyl, tert.-butyl, amyl, tert.-amyl, sec.-amyl, hexyl, isoheptyl, octyl, tert.-octyl, nonyl, dodecyl, tetradecyl, hexadecyl, octadecyl or eicosyl. If R$_{15}$, R$_{16}$, R$_{18}$ and/or R$_{19}$ are alkenyl groups, these can be allyl or butenyl.

R$_{15}$, R$_{18}$ and/or R$_{19}$ can be cycloalkyl groups with 6 to 8 carbon atoms such as, for example, cyclohexyl, α-methylcyclohexyl or cyclooctyl. If R$_{15}$, R$_{16}$, R$_{18}$ and/or R$_{19}$ are aralkyl groups, they can be benzyl or α-phenylethyl.

If R$_{15}$, R$_{18}$ and/or R$_{19}$ is an alkoxy group with 1 to 18 carbon atoms this can be, for example, methoxy, ethoxy, propoxy, butoxy, hexoxy, octoxy, decyloxy, dodecyloxy, tetradecyloxy, or octadecyloxy. R$_{15}$, R$_{18}$ and/or R$_{19}$ can also be an acyloxy group with 2 to 18 carbon atoms or an acylamino group with 2 to 18 carbon atoms, "acyl" being for example, an acyl radical of the following acids: acetic acid, propionic acid, butyric acid, isobutyric acid, valeric acid, caproic acid, 2-ethylcaproic acid, caprylic acid, capric acid, lauric acid, myristic acid, palmitic acid, stearic acid, acrylic acid, methacrylic acid, crotonic acid, oleic acid, benzoic acid, phenylacetic acid and salicyclic acid.

Compounds of the formula X which are particularly preferred are those in which R$_{15}$ denotes hydrogen, alkyl with 1 to 4 carbon atoms, chlorine or alkoxy with 1 to 12 carbon atoms, R$_{16}$ denotes hydrogen, alkyl with 1 to 4 carbon atoms or chlorine and R$_{17}$ denotes alkyl with 1 to 21, especially 1 to 17 carbon atoms, cyclohexyl, benzyl or one of the radicals

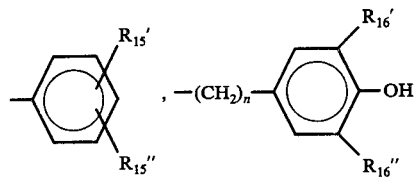

wherein n denotes 0 to 2, R$_{15}$' and R$_{15}$" independently of one another denote hydrogen, alkyl with 1 to 4 carbon atoms, chlorine or alkoxy with 1 to 12 carbon atoms, and R$_{16}$' and R$_{16}$" independently of one another denote hydrogen, alkyl with 1 to 4 carbon atoms or chlorine.

The compounds of Formula X are prepared according to procedures described in U.S. Pat. application Ser. No. 256,969, filed May 25, 1972, now abandoned.

Illustrative of the compounds of Formula X usable in the present invention are the following compounds:
N-salicyloyl-N'-stearoyl-hydrazine
N-(5-tert.-butyl-salicyloyl)-N'-stearoylhydrazine
N-(3,5-di-tert.butyl-salicyloyl)-N'-stearoylhydrazine
N-salicyloyl-N'-(4-methoxybenzoyl)-hydrazine
N-salicyloyl-N'-(4-tert.-butyl-benzoyl)-hydrazine
N-salicyloyl-N'-(4-acetylaminobenzoyl)-hydrazine
N-salicyloyl-N'-phenylacetyl-hydrazine
N-(5-chlorosalicyloyl)-N'-lauroyl-hydrazine
N-salicyloyl-N'-(4-salicyloylaminobenzoyl)-hydrazine
N-salicyloyl-N'-(3,4-ditert.-butyl-4-hydroxybenzoyl)-hydrazine
N-salicyloyl-N'-(4-tert.butyl-benzoyl)hydrazine
N,N'-disalicyloyl hydrazine
N,N'-di-(3,4-tert.butyl-2-hydroxybenzoyl)-hydrazine
N-salicyloyl-N'-2-ethylhexyl-hydrazine
N-salicyloyl-N'-lauroyl-hydrazine
N-salicyloyl-N'-(3,5-di-hexadecyloxybenzoyl)-hydrazine
N-salicyloyl-N'-(3,4-dimethylbenzoyl)-hydrazine
N-(4-octoxysalicyloyl)-N'-stearoylhydrazine
N-(4-methoxysalicyloyl)-N'-(4'-methoxybenzoyl)-hydrazine
N-salicyloyl-N'-β(3,5-ditert.-butyl-4-hydroxyphenyl)-propionyl-hydrazine.
N-(5-octadecoylaminosalicoyl)-N'-lauroyl-hydrazine.
N-salicyloyl-N'-acetyl-hydrazine
N,N'-di-(4-octoxysalicyloyl)-hydrazine A sixth class of metal deactivating compounds of this invention is represented by the generic formula

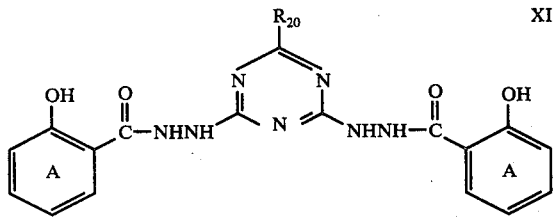

in which $R_{20}$ denotes hydrogen, alkyl with 1 to 8 carbon atoms, alkoxy with 1 to 18 carbon atoms, unsubstituted phenyl, phenyl substituted by lower alkyl groups, lower alkoxy groups, halogen and/or hydroxyl groups, the group

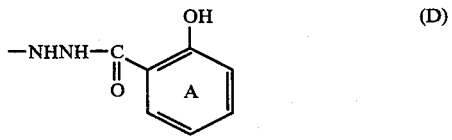 (D)

or the group

$R_{21}$ and $R_{22}$ independently of one another denote hydrogen, alkyl with 1 to 18 carbon atoms, cyclohexyl, benzyl, unsubstituted phenyl or phenyl substituted by 1 or 2 alkyl groups each having 1 to 8 carbon atoms, or $R_{21}$ and $R_{22}$ conjointly, with inclusion of the nitrogen atom, denote a saturated 5-membered to 7-membered heterocyclic ring, and the rings A are unsubstituted or are substituted by 1 or 2 alkyl groups each having 1 to 18 carbon atoms, an alkoxy group having 1 to 18, especially 1 to 4 carbon atoms and/or 1 to 3 chlorine atoms.

In formula XI, $R_{20}$ for example, denotes an alkyl group of 1 to 18 carbon atoms, such as methyl, ethyl, propyl, butyl, pentyl, hexyl, octyl, decyl, dodecyl, tetradecyl, hexadecyl or octadecyl, an alkoxy group with 1 to 18 carbon atoms, such as methoxy, propoxy, butoxy, hexoxy, octoxy, decyloxy, dodecyloxy, hexadecyloxy or octadecyloxy, or a phenyl group which can be substituted by lower alkyl, such as methyl, ethyl, propyl or butyl, by lower alkoxy groups, such as methoxy, ethoxy, propoxy, or butoxy, by halogen, such as chlorine or bromine and by a hydroxyl group, the latter preferably being in the ortho position. In the description, lower alkyl or alkoxy groups denote alkyl or alkoxy groups with 1 to 4 carbon atoms. $R_{20}$ can be unsubstituted, monosubstituted or disubstituted amino group, wherein the substituent or substituents can be unbranched or branched alkyl with 1 to 18 carbon atoms for example methyl, ethyl, propyl, isopropyl, butyl, tert.-butyl, pentyl, hexyl, octyl, tert.-octyl, decyl, dodecyl, tetradecyl, hexadecyl or octadecyl.

If $R_{20}$ is a phenyl substituted by 1 or 2 alkyl groups, the alkyl groups contain 1 to 8 carbon atoms and are, for example, methyl, ethyl, propyl, butyl, isobutyl, amyl, hexyl, octyl or isooctyl. $R_{20}$ can also be a five-membered to seven-membered heterocyclic group containing nitrogen in the nucleus, which is bonded via a nitrogen atom to the triazine ring of the compound of the formula XI, for example the piperidine or the morpholine group. The nuclei A in the formula XI can be substituted, for example, by one or two identical or different alkyl groups of 1 to 18 carbon atoms, such as methyl, ethyl, propyl, isopropyl, butyl, tert.-butyl, pentyl, hexyl, octyl, tert.-octyl, decyl, dodecyl, tetradecyl, hexadecyl and octadecyl, or an alkoxy group with 1 to 18 carbon atoms, such as methoxy, propoxy, butoxy, hexoxy, decyloxy, dodecyloxy, hexadecyloxy, or octadecyloxy.

Preferred compounds of the formula XI are those in which $R_{20}$ denotes an alkyl group with 1 to 3 carbon atoms, an alkoxy group with 2 to 4, especially 3 and 4, carbon atoms, or the group

wherein $R_{21}'$ and $R_{22}'$ independently of one another are hydrogen, alkyl with 1 to 8 carbon atoms, cyclohexyl, benzyl, or phenyl, or $R_{21}'$ and $R_{22}'$, with inclusion of the nitrogen atom, form the radical of pyrrolidine, piperidine, morpholine or hexamethyleneimine, and $R_{21}'$ and $R_{22}'$ together contain 1 to 8 carbon atoms.

Compounds in which $R_{21}'$ and $R_{22}'$ independently of one another denote hydrogen, alkyl with 1 to 8 carbon atoms or phenyl, and $R_{21}'$ and $R_{22}'$ together contain 1 to 8 carbon atoms, are particularly preferred.

Most preferred compounds are those in which $R_{20}$ is hydrogen, alkoxy containing 1 to 18 carbon atoms, especially those in which $R_{20}$ denotes the group of the formula D or the group

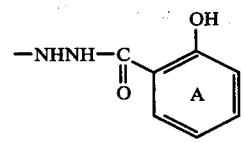

Particularly preferred compounds are those in which $R_{20}$ denotes alkoxy with 1 to 4 carbon atoms, the group

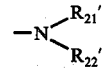

or the group

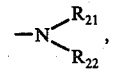

$R_{21}$ and $R_{22}$ independently of one another denote alkyl with 1 to 18 carbon atoms, cyclohexyl, benzyl or phenyl, whereby $R_{21}$ and $R_{22}$ cannot be all two phenyl, or $R_{21}$ and $R_{22}$ together, with inclusion of the nitrogen atom, denote a piperidine or morpholine ring, and the rings A are unsubstituted or are substituted by 1 or 2 alkyl groups with 1 to 8 carbon atoms each, an alkoxy group with 1 to 18 carbon atoms, and/or one chlorine.

The compounds of Formula XI are prepared according to procedures described in U.S. Pat. application Ser. No. 150,757, filed June 7, 1971, now U.S. Pat. No. 5,850,918.

Illustrative of the compounds of Formula XI usable in the present invention are the following compounds:

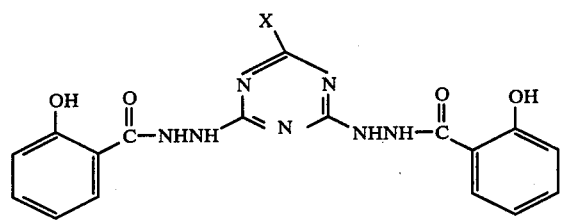

X = n-propoxy, morpholine, n-octylamine, n-propyl, phenyl or phenylamine 2-(octadecylamino)-4,6-di-salicyloylhydrazino-s-triazine 2-propoxy-4,6-di-salicoylhydrazino-s-trianzine 2-(di-2-ethylhexylamino)-4,6-bis-(2-hydroxy-5-tert.-butylbenzoylhydrazino)-s-triazine 2-(dioctadecylamino-4,6-bis-(2-hydroxy-5-tert.-octyl-benzoyl-hydrazino)-s-triazine 2-dioctadecylamino-4,6-bis-(2-hydroxy-4-octoxybenzoylhydrazino)-s-triazine 2-(di-2-ethylhexyl-amino)-4,6-bis-(2-hydroxy-4-butoxybenzoylhydrazino)-s-triazine 2-(di-isopropylamino)-4,6-bis-(2-hydroxy-4-octoxybenzoylhydrazino)-s-triazine 2-morpholino-4,6-disalicoyl-hydrazino-s-triazine 2,4,6-tris-(2-hydroxy-4-octoxy-benzoylhydrazino)-s-triazine 2-propoxy-4,6-bis-(2-hydroxy-4-octoxybenzoylhydrazino)-s-triazine 2-propyl-4,6-di-salicyloylhydrazino-s-triazine 2-phenyl-4,6-di-salicyloylhydrazino-s-triazine and compounds of the formula

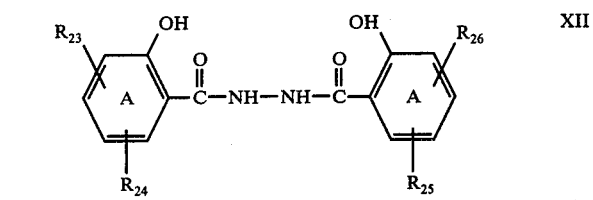

in which X denotes the radicals propyl, propoxy, dodecylamin, morpholine, phenyl, phenylamine.

A seventh class of metal deactivating compounds of this invention is represented by the generic formula

XII in which $R_{23}$, $R_{24}$, $R_{25}$ and $R_{26}$ independently of one another denote hydrogen, alkyl with 1 to 18, especially 1 to 6 carbon atoms, alkenyl with 3 to 4 carbon atoms, cycloalkyl with 6 to 8 carbon atoms, aralkyl with 7 to 9 carbon atoms, alkoxy groups with 1 to 18 carbon atoms, the latter preferably only as substituents $R_{23}$ and $R_{25}$ phenyl and chlorine, and $R_{23}$ and $R_{25}$ independently of one another can additionally also denote hydroxyl, acyloxy with 2 to 18 carbon atoms or acylamino with 2 to 18 carbon atoms.

The most preferred compounds are those which are symmetrical but also the asymmetrical compounds are readily available.

In the formula XII, $R_{23}$, $R_{24}$, $R_{25}$ and $R_{26}$ for example denote an alkyl group with 1 to 18 carbon atoms, such as methyl, ethyl, propyl, butyl, sec.-butyl, tert.-butyl, n-amyl, sec.-amyl, tert.-amyl, tert.-hexyl, isoheptyl, octyl, isooctyl, tert.-octyl, decyl, undecyl, dodecyl, tert.-dodecyl, tetradecyl or octadecyl, an alkenyl group with 3 to 4 carbon atoms, such as allyl, or butenyl, a cycloalkyl group with 6 to 8 carbon atoms, such as cyclohexyl, or cyclooctyl, an aralkyl group with 7 to 9 carbon atoms, such as benzyl, α-methylbenzyl or α,α-dimethylbenzyl or an alkoxy group with 1 to 18 carbon atoms, such as a methoxy, propoxy, butoxy, octoxy, decyloxy, dodecyloxy, tetradecyloxy or octadecyloxy-group.

The substituents $R_{23}$ and $R_{25}$ denoting acyloxy or acylamino groups with 2 to 18 carbon atoms can be acyl derivatives or carboxylic acids, such as, for example, acetic acid, propionic acid, butyric acid, isobutyric acid, valeric acid, caproix acid, 2-ethylcaproic acid, lauric acid, capric acid, myristic acid, palmitic acid, stearic acid, acrylic acid, methacrylic acid, crotonic acid, isocrotonic acid, oleic acid, benzoic acid and phenylacetic acid.

Amongst the compounds of the formula XII, those are preferred in which $R_{23}$, $R_{24}$, $R_{25}$ and $R_{26}$ independently of one another denote hydrogen, alkyl groups with 1 to 12, especially 1 to 6, most preferred 1 to 4 carbon atoms, cycloalkyl groups with 6 or 7 carbon atoms, phenyl, and chlorine and $R_{23}$ and $R_{25}$ independently of one another also denote hydroxyl, alkoxy groups with 1 to 18, especially 1 to 12 carbon atoms, acyloxy groups with 2 to 18 carbon atoms and acylamino groups with 2 to 18 carbon atoms.

Amongst the compounds of the formula XII, those are particularly preferred in which $R_{23}$, $R_{24}$, $R_{25}$ and $R_{26}$ independently of one another denote hydrogen, alkyl groups with 1 to 4 carbon atoms, cyclohexyl, α-methylbenzyl, α,α-dimethylbenzyl and chlorine and $R_{23}$ and $R_{25}$ independently of one another also denote alkoxy groups with 1 to 12 carbon atoms, or those in which $R_{23}$ and $R_{25}$ independently of one another denote hydrogen, alkyl with 1 to 8 carbon atoms, alkoxy with 1 to 8 carbon atoms, phenyl, hydroxyl, chlorine, α-methylbenzyl, alkanyloxy with 2 to 18 carbon atoms, or alkanoylamino with 2 to 18 carbon atoms, $R_{23}$ can also denote alkoxy with 9 to 17 carbon atoms and $R_{24}$ and $R_{26}$ independently of one another denote hydrogen tert.-butyl or methoxy.

The compounds of Formula XII are prepared according to procedures described in U.S. Pat. application Ser.

No. 186,393, filed Oct. 4, 1971, now U.S. Pat. No. 3,849,492.

Illustrative of the compounds of Formula XII usable in the present invention are the following compounds:
N,N'-bis-salicyloyl-hydrazine
N,N'-bis-(2-hydroxy-5-tert.-butylbenzoyl)-hydrazine
N,N'-bis-(2-hydroxy-5-tert.-octylbenzoyl)-hydrazine
N,N'-bis-(2-hydroxy-3,5-di-tert.-butylbenzoyl)-hydrazine
N,N'-bis-(2-hydroxy-5-methylbenzoyl)-hydrazine
N,N'-bis-(2-hydroxy-5-chlorobenzoyl)-hydrazine
N,N'-bis-(2-hydroxy-3,5-dichlorobenzoyl)-hydrazine
N,N'-bis-(2-hydroxy-5-tert.-dodecylbenzoyl)-hydrazine
N,N'-bis-(2-hydroxy-4,5-dimethylbenzoyl)-hydrazine
N,N'-bis-(2-hydroxy-5-sec.-butylbenzoyl)-hydrazine
N,N'-bis-(2-hydroxy-5-sec.-octylbenzoyl)-hydrazine
N,N'-bis-(2-hydroxy-5-sec.-nonylbenzoyl)-hydrazine
N,N'-bis-(2-hydroxy-5-cyclohexylbenzoyl)-hydrazine
N,N'-bis-(2-hydroxy-5-cyclooctylbenzoyl)-hydrazine
N,N'-bis-(2-hydroxy-5-α-methylbenzylbenzoyl)-hydrazine
N,N'-bis-(2-hydroxy-4-methoxybenzoyl)-hydrazine
N,N'-bis-(2-hydroxy-4-ethoxybenzoyl)-hydrazine
N,N'-bis-(2-hydroxy-4-butoxybenzoyl)-hydrazine
N,N'-bis-(2-hydroxy-4-dodecylbenzoyl)-hydrazine
N,N'-bis-(2-hydroxy-4-octadecyloxybenzoyl)-hydrazine
N,N'-bis-(2-hydroxy-4-acetoxybenzoyl)-hydrazine
N,N'-bis-(2-hydroxy-4-lauroylbenzoyl)-hydrazine
N,N'-bis-(2-hydroxy-4-stearoyloxybenzoyl)-hydrazine
N,N'-bis-(2-hydroxy-4-octoxybenzoyl)-hydrazine
N,N'-bis-(2-hydroxy-5-octoxybenzoyl)-hydrazine
N-(2-hydroxy-4-octoxybenzoyl)-N'-(2-hydroxy-5-tert.-octylbenzoyl)-hydrazine
N-(2-hydroxybenzoyl)-N'-(2-hydroxy-5-hexadecyloxybenzoyl)-hydrazine
N-(2-hydroxybenzoyl)-N'-(2-hydroxy-5-stearyloxybenzoyl)-hydrazine
N-(2-hydroxybenzoyl)-N'-(2-hydroxy-5-butoxybenzoyl)-hydrazine
N,N'-bis-(2-hydroxy-4-stearyloxybenzoyl)-hydrazine.
N,N'-bis[2-hydroxy-4-(stearoylamide)-benzoyl]-hydrazine An eigth class of metal deactivating compounds of this invention is represented by the generic formula

$R_{27}$—CO—NHNH—CO—$R_{28}$       XIII in which $R_{27}$ and $R_{28}$ independently of one another denote the unsubstituted phenyl group, a phenyl group substituted by a hydroxyl group in the m— or p— position by one or two alkyl groups each with 1 to 4 carbon atoms, by one or two alkenyl groups each with 3 or 4 carbon atoms by one or two cycloalkyl groups each with 6 to 8 carbon atoms, by one or two chlorine atoms, by one or two alkoxy groups each with 1 to 18 carbon atoms, by one or two acyloxy groups each with 2 to 18 carbon atoms, by an acylamino group with 2 to 18 carbon atoms or by an amino group in the o-position, or a pyridyl radical or $R_{28}$ also denotes hydrogen, alkyl with 1 to 18 carbon atoms, cyclohexyl or benzyl.

It has now been found that the compounds of the formula XIII

$R_{27}$—CO—NHNH—CO—$R_{28}$       (XIII)

in which $R_{27}$ and $R_{28}$ independently of one another denote the unsubstituted phenyl group, a phenyl group substituted by a hydroxyl group in the m- or p-position, by one or two alkyl groups each with 1 to 4 carbon atoms, by one or two chlorine atoms, by one or two alkoxy groups each with 1 to 18 carbon atoms, by one or two acyloxy groups each with 2 to 18 carbon atoms, by an acylamino group with 2 to 18 carbon atoms or by an amino group in the o-position, or a pyridyl radical or $R_{28}$ also denotes hydrogen, alkyl with 1 to 18 carbon atoms, cyclohexyl or benzyl, are especially valuable.

If $R_{27}$ and $R_{28}$ are phenyl groups substituted by alkyl groups with 1 to 4 carbon atoms each, the alkyl groups can be methyl, ethyl, propyl, iso-propyl, butyl, sec.butyl or tert.butyl. As alkenyl-substituted phenyl groups, $R_{27}$ and $R_{28}$ can, for example, be allylphenyl or butenylphenyl. If the substituents of the phenyl groups $R_{27}$ and $R_{28}$ are cyclohexyl groups each with 6 to 8 carbon atoms, these substituents can be cyclohexyl, α-methylcyclohexyl or cyclooctyl. If $R_{27}$ and $R_{28}$ denote phenyl groups substituted by alkoxy groups each with 1 to 8 carbon atoms, the alkoxy groups can be methoxy, ethoxy, propoxy, iso-propoxy, butoxy, sec.-butoxy, tert.-butoxy, pentoxy, tert.-pentoxy, pentoxy, hexoxy, iso-heptoxy, octoxy or 1,1,3,3-tetramethylbutoxy, undecyloxy, dodecyloxy, hexadecyloxy, or octadecyloxy. $R_{27}$ and $R_{28}$ can also be phenyl radicals substituted by acyloxy or acylamino groups, each with 2 to 18 carbon atoms, in which case "acyl" can be, for example, the acyl radical of the following acids; acetic acid, propionic acid, butyric acid, isobutyric acid, valeric acid, caproic acid, 2-ethylcaproic acid, caprylic acid, capric acid, lauric acid, myristic acid, palmitic acid, stearic acid, benzoic acid or phenylacetic acid. The preferred acyl radical is the radical of the benzoic acid. If $R_{27}$ denotes a substituted phenyl groups, $R_{28}$ can also be an alkyl group with 1 to 18 carbon atoms such as methyl, ethyl, propyl, butyl, pentyl, hexyl, iso-heptyl, octyl, nonyl, undecyl, dodecyl, tetradecyl, hexadecyl or octadecyl.

The preferred compounds of the formula XIII are those in which $R_{27}$ and $R_{28}$ independently of one another denote a phenyl group which is substituted by a hydroxyl group in the m— or p— position, by one or two alkoxy groups each with 1 to 18, and particularly preferentially 1 to 16, carbon atoms, by an acylamino group with 2 to 7 carbon atoms, or by an amino group in the o— position, or in which, if $R_{27}$ represents an acylaminophenyl group with 2 to 7 carbon atoms, in the acyl radical, $R_{28}$ also denotes alkyl with 1 to 18, especially 1 to 8 carbon atoms, hydrogen or cyclohexyl.

The compounds of Formula XIII are prepared according to procedures described in U.S. Pat. application Ser. No. 307,269, filed Nov. 16, 1972, now U.S. Pat. No. 3,884,874.

Illustrative of the compounds of Formula XIII usable in the present invention are the following compounds:
N,N'-bis-(α-pyridinecarboxy)-hydrazine
N,N'-bis-(3,5-dimethoxybenzoyl)-hydrazine
N,N'-bis-(4-octyloxybenzoyl)-hydrazine
N-(4-benzoylaminobenzoyl)-N'-benzoyl-hydrazine
N-(4-acetylaminobenzoyl)-N'-acetyl-hydrazine
N,N'-bis-(2-aminobenzoyl)-hydrazine
N,N'-bis-(3,5-hexadecoxybenzoyl)-hydrazine
N,N'-bis-(4-acetylaminobenzoyl)-hydrazine
N,N'-bis-(3-hydroxybenzoyl)-hydrazine.

A ninth class of metal deactivating compounds of this invention is represented by the generic formula

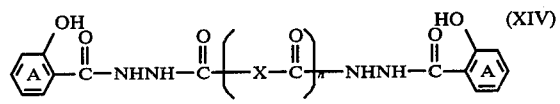

in which X denotes a direct bond, an alkylene radical with 1 to 8 carbon atoms, a phenylene radical or a naphthylene radical, —CH$_2$SCH$_2$— or —CH$_2$CH$_2$SCH$_2$CH$_2$—, and $n$ denotes 0 or 1, and the rings A are unsubstituted or one ring A or both rings A are substituted by alkyl groups, alkenyl groups, cycloalkyl groups, aralkyl groups, further hydroxyl groups, alkoxy groups, acyloxy groups, acylamino groups, or halogen, preferably by 1 or 2 alkyl groups with 1 to 18 carbon atoms, 1 or 2 alkenyl groups with 3 to 4 carbon atoms, 1 or 2 cycloalkyl groups with 6 to 8 carbon atoms, 1 or 2 benzyl groups, 1 or 2 α-methylbenzyl groups, a further hydroxyl group, an alkoxy group with 1 to 18 carbon atoms, an acyloxy group with 2 to 18 or an acylamino group with 2 to 18 carbon atoms, and 1 or 2 chlorine atoms.

X in the formula XIV can, for example, be an alkylene radical with 1 to 8 carbon atoms, such as methylene, ethylene, propylene, butylene, trimethylbutylene, pentylene, hexylene or octylene. It can also denote a phenylene radical, such as the 1,3- or 1,4-phenylene radical, or a naphthylene radical, such as the 2,6- or 1,4-naphthylene radical. The rings A can each be substituted by 1 or 2 alkyl groups with, preferably, 1 to 8 carbon atoms, such as, for example, methyl, ethyl, propyl, iso-propyl, butyl, sec.-butyl, tert.-butyl, amyl, tert.-amyl, sec.-amyl, hexyl, iso-heptyl, octyl, tert.-octyl, sec.-nonyl and dodecyl. The rings A can also each be substituted by 1 or 2 alkenyl groups with, preferably, 3 or 4 carbon atoms, such as, for example, allyl or butenyl, or 1 or 2 cycloalkyl groups with preferably 6 to 8 carbon atoms, such as, for example, cyclohexyl, α-methylcyclohexyl or cyclooctyl. If the substituent of the rings A is an alkoxy group with, preferably 1 to 18 carbon atoms, this group can, for example, be methoxy, ethoxy, propoxy, butoxy, hexoxy, octoxy, decyloxy, dodecyloxy, tetradecyloxy or octadecyloxy. The rings A can furthermore each be substituted by an acyloxy group, preferably with 2 to 18 carbon atoms, or an acylamino group, preferably with 2 to 18 carbon atoms and the acyl radicals of the following acids, for example, can be involved: acetic acid, propionic acid, butyric acid, isobutyric acid, valeric acid, caproic acic, 2-ethylcaproic acid, caprylic acid, capric acid, lauric acid, myristic acid, palmitic acid, stearic acid, acrylic acid, methacrylic acid, crotonic acid, oleic acid, benzoic acid and phenylacetic acid.

The compounds of the formula XIV in which X denotes the direct bond, an alkylene radical with 1 to 8 carbon atoms, a phenylene radical or a naphthylene radical and $n$ denotes 0 or 1 and the rings A can be unsubstituted or each substituted by 1 or 2 alkyl groups with 1 to 4 carbon atoms, an alkoxy group with 1 to 18 carbon atoms or chlorine, are particularly preferred.

Those compounds of the formula XIV are particularly preferred, in which X denotes an alkylene radical with 1 to 8 carbon atoms and $n$ denotes 0 or 1 and the rings A are unsubstituted or in which X denotes the direct bond and $n$ denotes 1 and the rings A are each substituted by 1 or 2 alkyl groups with 1 to 4 carbon atoms and/or an alkoxy group with 1 to 18 carbon atoms.

The compounds of Formula XIV are prepared according to procedures described in U.S. Pat. application Ser. No. 170,379, filed Aug. 9, 1971, now abandoned.

Illustrative of the compounds of Formula XIV usable in the present invention are the following compounds:
N,N'-bis-salicyloyl-carbonic acid dihydrazide
N,N'-bis-(2-hydroxy-5-methyl-benzoyl)-oxalic acid dihydrazide
N,N'-bis-salicyloyl-oxalic acid dihydrazide
N,N'-bis-(2-hydroxy-5-tert.butyl-benzoyl)-oxalic acid dihydrazide
N,N'-bis-(2-hydroxy-4-octoxy-benzoyl)-oxalic acid dihydrazide
N,N'-bis-salicyloyl-adipic acid dihydrazide
N,N'-bis-salicyloyl-sebacic acid dihydrazide
N,N'-bis-(2-hydroxy-3,5-di-tert.butyl-benzoyl)-adipic acid dihydrazide
N,N'-bis-(2-hydroxy-3,5-di-tert.butyl-benzoyl)-terephthalic acid dihydrazide
N,N'-bis-(2-hydroxy-5-tert.butyl-benzoyl)-terephthalic acid dihydrazide
N,N'-bis-(2-hydroxy-4-methoxybenzoyl)-sebacic acid dihydrazide
N,N'-bis-(2-hydroxy-4-octoxybenzoyl)-oxalic acid dihydrazide
N,N'-bis-(2-hydroxy-4-octoxybenzoyl)-sebacic acid dihydrazide
N,N'-bis-(2-hydroxy-3,5-di-tert.butyl-benzoyl)-oxalic acid dihydrazide
N,N'-bis-(2-hydroxy-4-methoxy-benzoyl)-oxalic acid dihydrazide
N,N'-bis-(2-hydroxy-4-methoxy-benzoyl)-trimethyladipic acid dihydrazide.
N,N'-bis-(2-hydroxy-4-acetoxy-benzoyl)-adipicacid dihydrazide.

A tenth class of metal deactivating compounds of this invention is represented by the generic formula

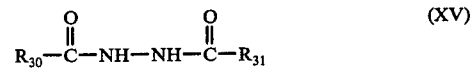

wherein $R_{30}$ and $R_{31}$ independently of one another are alkyl of from 1 to 17 carbon atoms. Compounds of Formula XV can be prepared by methods well known in the art.

Examples of preferred compounds of Formula XV are $$H_3C-\overset{O}{\underset{\|}{C}}-\overset{H}{\underset{|}{N}}-\overset{H}{\underset{|}{N}}-\overset{O}{\underset{\|}{C}}-CH_3 \text{ and}$$

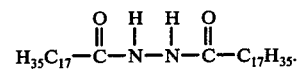

In addition to the classes of compounds presented above, the N-N containing compounds disclosed in the following patents can also be employed as the adhesion promoting compound of the invention and the disclosures contained in these patents are incorporated herein.
U.S. Pat. No. 3,549,572
U.S. Pat. No. 3,673,152
U.S. Pat. No. 3,560,434
U.S. Pat. No. 3,629,189
German Offenlegungsschrift No. 2164234
German Offenlegungsschrift No. 1927447

In the U.S. Pat. No. 3,560,443 is disclosed 3-amino-1,2,4-triazole.

The U.S. Pat. No. 3,549,572 describes hydrazides of mercapto carboxylic acids. A preferred class of compounds have the formulae XVI and XVII

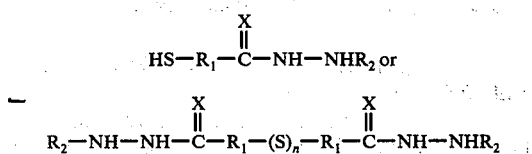

wherein X denotes an oxygen or sulfur atom, $n$ is an integer from 1 to 2, $R_1$ is an alkylene radical containing 1 or 2 carbon atoms or an arylene radical containing from 6 to 10 carbon atoms and $R_2$ denotes hydrogen, phenyl and a residue of the formula

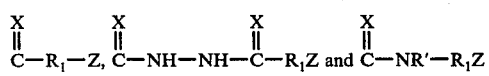

wherein z represents hydrogen, hydroxyl and mercapto groups, $R'$ represents hydrogen or an alkyl group containing 1 to 4 carbon atoms and X and $R_1$ are defined above.

Preferably X represents the oxygen atom. Illustrative examples are:
Thioglycolacid hydrazide
N'-(β-thiopropionyl)-N'-salicyloyl-hydrazide.

In the U.S. Pat. No. 3,673,152 there are disclosed amine or amide derivatives of the formula

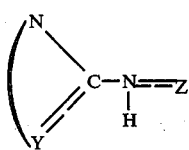

wherein

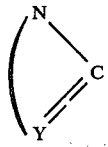

is a heterocyclic ring selected from the group consisting of

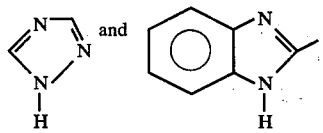

and Z is selected from the group consisting of

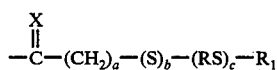

wherein R is selected from the group consisting of methylene, alkyl substituted methylene, aryl-substituted methylene and arylene, $R_1$ is selected from the group consisting of hydrogen, alkyl having from one to 18 carbon atoms,

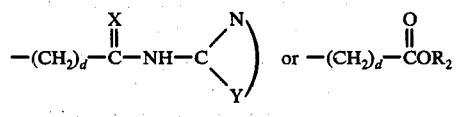

wherein $R_2$ is hydrogen, alkyl having from one to 10 carbon atoms or benzyl.

wherein A is selected from the group consisting of oxygen sulfur and two hydrogen atoms, and $R_3$ is selected from the group consisting

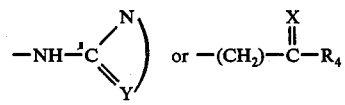

wherein $R_4$ is selected from the group consisting of aryl, o-hydroxyaryl, benzyl, and alkyl having from one to 18 carbon atoms.

3. Two radicals $—R_5$ and $—R_6$ wherein $R_5$ is selected from hydrogen, hydroxymethyl or hydroxyethyl and $R_6$ is selected from hydroxymethyl, hydroxyethyl or a residue of the formula

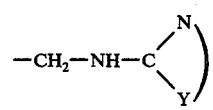

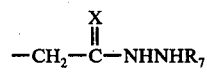

wherein $R_7$ is hydrogen, alkyl having from one to 18 carbon atoms, benzyl and aryl,

wherein $R_8$ is selected from the group consisting of $R_4$ and

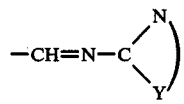

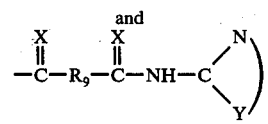

wherein $R_9$ is phenyl, $—(CH_2)_e$,

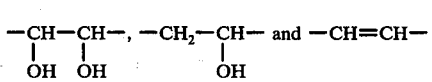

and

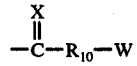

wherein $R_{10}$ is an alkylene group containing 1 to 17 carbon atoms or the direct bond and W is hydrogen, or $R_{10}$ is an alkylene group containing 1 to 8 carbon atoms or the direct bond and W is the carboxylic group, and X in each of the above is selected from the group consisting of oxygen and sulfur and $a$ in each of the above is 0, 1 or 2; $b$ is 1 or 2; and $c$ is 0 or 1; $d$ is 0, 1 or 2, and $e$ is 0 to 8. Preferably X is oxygen and $e$ is an integer of from 0 to 6 and Z denotes the residues from 1 to 6.

Examples of preferred compounds from U.S. Pat. No. 3,673,152 are

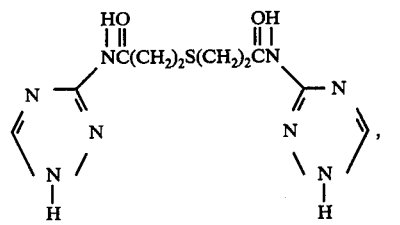

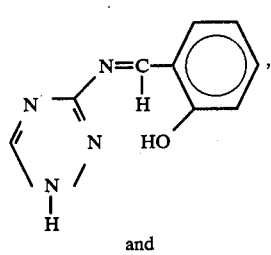

and

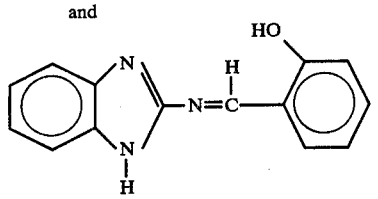

An eleventh class of compounds are represented by the formula IXX

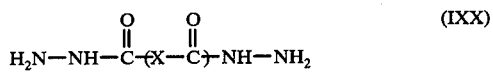

wherein X represents the direct bond, phenylene or naphthaline radical, which may be substitued by alkyl, halogen, phenyl, alkoxy or alkyl or an $C_nH_{2n}$ group, $n$ being a number from 1 to 8, especially 1 to 6.

A twelfth useful class of compounds have the general formula XX $$R_{32}-CO-NH-NH_2 \quad (XX)$$

wherein $R_{32}$ is benzyl, the phenyl group, alkyl with 1 to 17 carbon atoms, a phenyl or benzyl group substituted by 1 or 2 hydroxyl groups, by 1 or 2 alkyl groups containing 1 to 6, especially 1 to 4 carbon atoms, by 1 or 2 chlorine atoms, by 1 or 2 alkoxy groups, containing 1 to 18, especially 1 to 12 carbon atoms, by 1 or 2 acyloxy groups each with 2 to 18 carbon atoms or by an acylamino group having 2 to 18 carbon atoms.

Examples of preferred compounds of formula XX are benzoic acid hydrazide salicylic acid hydrazide, and stearic acid hydrazide.

A thirteenth useful class of compounds have the general formula

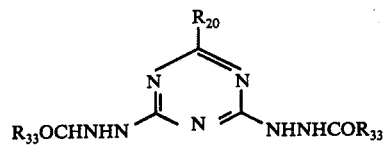

wherein $R_{20}$ is defined as on pages 19 – 25 above in the formula XI compounds, and $R_{33}$ independently of each other are alkyl with 1 to 17 carbon atoms, aralkyl with 7 to 15 carbon atoms, especially benzyl, phenylethyl and phenylpropyl, aralkyl with 7 to 15 carbon atoms substituted by 1 or 2 alkyl groups each having 1 to 18 carbon atoms, especially 1 to 4 carbon atoms, phenyl, phenyl substituted by 1 or 2 alkyl groups each having 1 to 4 carbon atoms, or cyclohexyl.

Examples of preferred compounds of formula XXI are

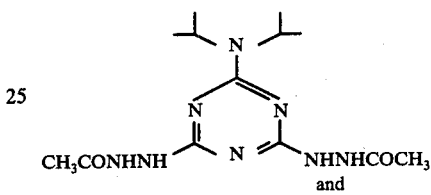

and

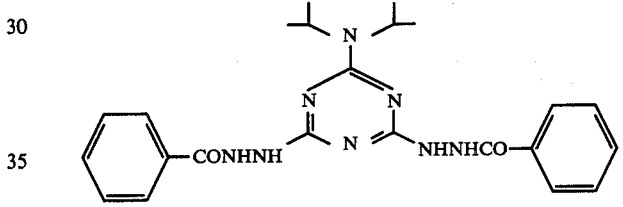

A fourteenth useful class of compounds have the general formula

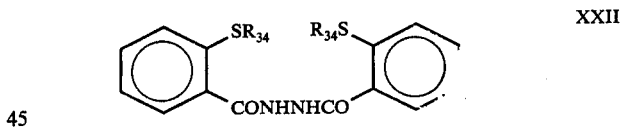

wherein $R_{34}$ independently of each other are alkyl with 1 to 18 carbon atoms, especially methyl.

An example of a preferred compound of formula XXII is

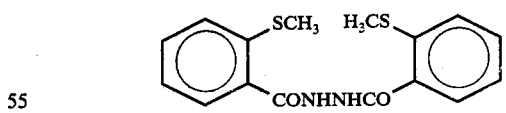

A fifteenth useful class of compounds have the general formula

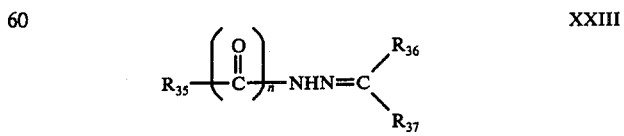

wherein $R_{35}$ is hydrogen, alkyl with 1 to 17 carbon atoms, aralkyl with 7 to 15 carbon atoms, especially benzyl, phenylethyl and phenylpropyl, aralkyl with 7 to 15 carbon atoms substituted by 1 or 2 alkyl groups each having 1 to 4 carbon atoms, cyclohexyl, phenyl, hydroxyphenyl, alkylphenyl with 7 to 14 carbon atoms, chlorophenyl, dichlorophenyl, alkoxyphenyl with 7 to 24 carbon atoms,

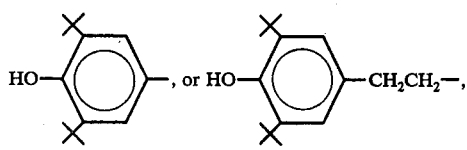

$R_{36}$ is hydrogen; alkyl with 1 to 13, preferably 1 to 9, carbon atoms; phenyl; hydroxyphenyl, or hydroxyphenyl substituted by lower alkyl or alkoxy of 1 to 6 carbon atoms, phenyl or chloro, especially hydroxyphenyl, or —CH=NNHCOR$_{35}$, where $R_{35}$ is as defined above.

$R_{37}$ is hydrogen; alkyl with 1 to 13, preferably 1 to 9, carbon atoms; phenyl; hydroxyphenyl, or hydroxyphenyl substituted by lower alkyl or alkoxy or 1 to 6 carbon atoms, phenyl or chloro, especially hydroxyphenyl, or together with $R_{36}$ is pentamethylene; and $n$ is 0 or 1.

A sixteenth useful class of compounds have the general formula

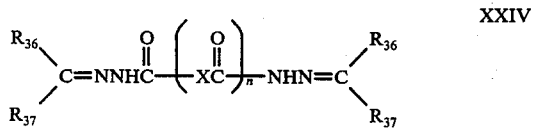

XXIV wherein $R_{36}$ and $R_{37}$ are as defined above,
X is the direct bond, an alkylene radical having from 1 to 8 carbon atoms, a phenylene radical, a naphthylene radical, —CH$_2$SCH$_2$—, —CH$_2$CH$_2$SCH$_2$CH$_2$—, or —CH=CH—, and $n$ is 0 or 1.

$R_{35}$ in Formula XXIII can be a straight- or branched-chain alkyl group having from 1 to 17 carbon atoms, such as methyl, ethyl, n-propyl, n-butyl, isobutyl, tertiary-butyl, pentyl, hexyl, isoheptyl, octyl, iso-octyl, decyl, undecyl, dodecyl, tetradecyl, or heptadecyl, preferably alkyl of from 1 to 6 carbon atoms, especially methyl or n-hexyl; or an alkylphenyl group having from 7 to 14 carbon atoms such as, e.g., phenyl which is substituted by methyl, tert.-butyl or tert.-octyl groups; or an alkoxyphenyl group having from 7 to 24 carbon atoms such as, e.g., phenyl which is substituted by methoxy, propoxy, butoxy, hexoxy, octoxy, decyloxy, dodecyloxy, tetradecyloxy or octadecyloxy.

If $R_{36}$ in formulas XXIII and XXIV is hydrogen, $R_{37}$ is advantageously an alkyl group having from 1 to 6 carbon atoms, especially a methyl or n-hexyl group.

If $R_{36}$ and $R_{37}$ are each alkyl radicals having from 1 to 12 carbon atoms, they may be, for example, a methyl, ethyl, n-propyl, n-butyl, iso-butyl, tertiary-butyl, n-amyl, iso-amyl, n-hexyl, n-heptyl, n-octyl, iso-octyl, n-nonyl, n-decyl, n-undecyl or n-dodecyl group, but are preferably of from 1 to 6 carbon atoms and most preferably are each a methyl group.

When X in Formula XXIV is an alkylene radical having from 1 to 8 carbon atoms, this can be, e.g., methylene, ethylene, propylene, butylene, pentylene, hexylene or octylene. X can also represent a phenylene radical such as the 1,3- or 1,4-phenylene radical, or a naphthylene radical such as the 2,6- or 1,4-naphthylene radical.

Examples of preferred compounds of formula XXIII are

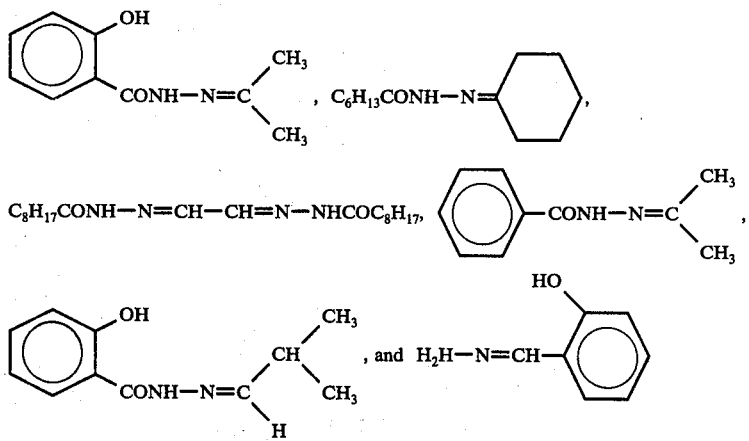

Examples of preferred compounds of formula XXIV are

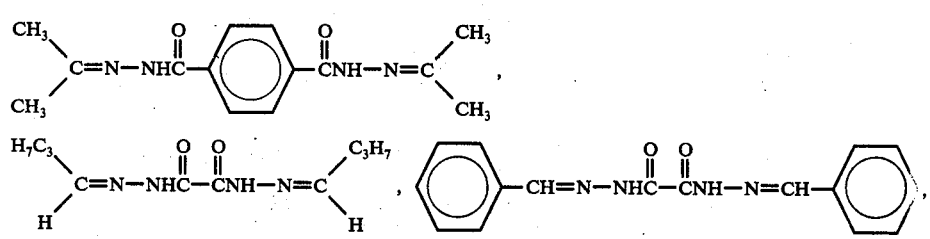

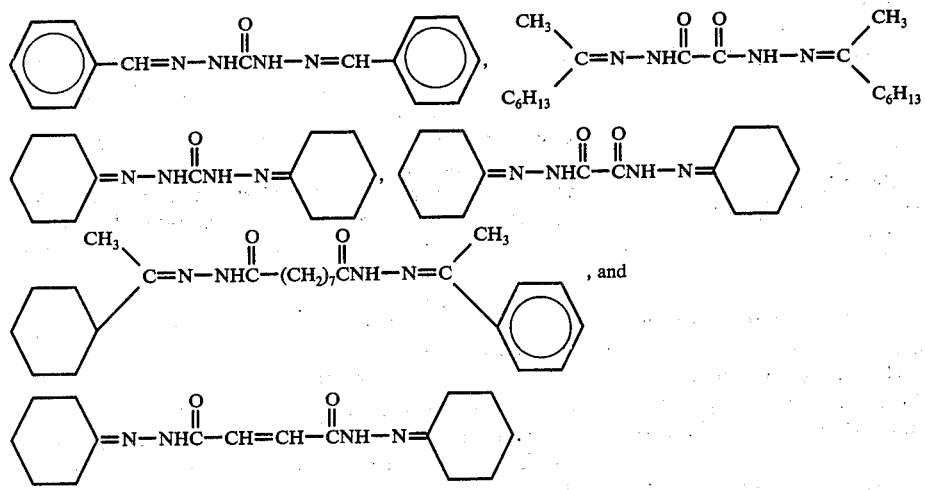

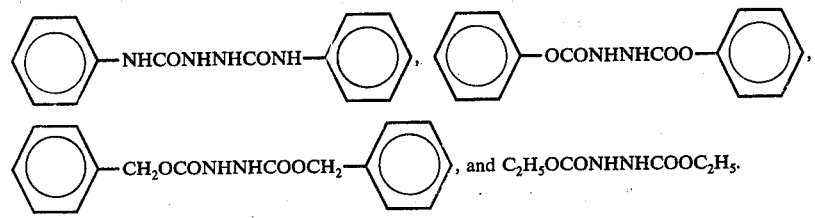

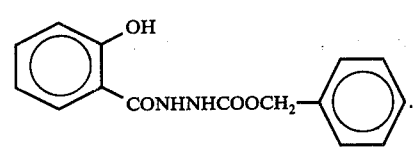

A seventeenth useful class of compounds have the general formula $$R_{38}-Y-CO-NHNH-CO-Y-R_{38} \quad XXV$$

wherein $R_{38}$ independently of each other are alkyl of 1 to 18 carbon atoms, cyclohexyl, benzyl, phenyl, alkylphenyl of 7 to 14 carbon atoms, or dialkylphenyl of 8 to 16 carbon atoms, and Y is —O— or —NH—.

Examples of preferred compounds of formula XXV are

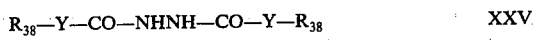

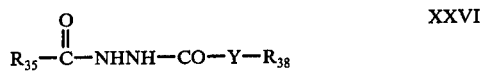

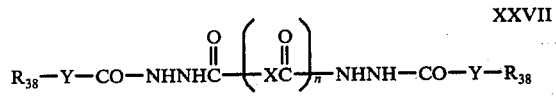

An eighteenth useful class of compounds have the general formula $$R_{35}-\overset{O}{\overset{\|}{C}}-NHNH-CO-Y-R_{38} \quad XXVI$$

wherein $R_{35}$ is defined as in formula XXIII and $R_{38}$ and Y are defined as in formula XXV.

An example of a preferred compound of formula XXVI is

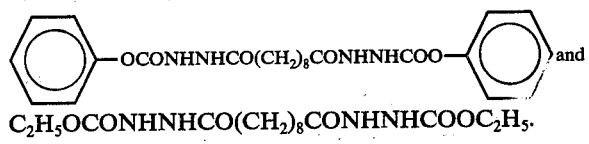

A nineteenth useful class of compounds have the general formula $$R_{38}-Y-CO-NHNH\overset{O}{\overset{\|}{C}}\!\!\left(\!XC\!\!\right)_{\!n}\!\!NHNH-CO-Y-R_{38} \quad XXVII$$

wherein $R_{38}$ and Y are defined as in formula XXV, X is defined as in formula XXIV, and n is 0 or 1.

Examples of preferred compounds of formula XXVII are

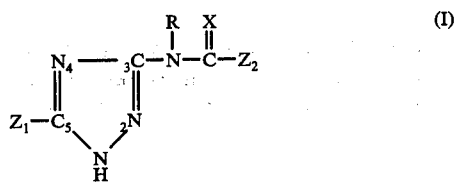

$C_2H_5OCONHNHCO(CH_2)_8CONHNHCOOC_2H_5$.

A twentieth useful class of compounds are disclosed in German Offenlegungsschrift No. 2,164,234. In this reference there are described amides of 2-hydroxyaryl carboxylic acids and 3-amino-1,2,4-triazole, wherein the acid and the triazole can be substituted. Preferred is salicyl acid and substituted derivatives.

The 3-salicylamido- and 3-benzosalicylamido-1,2,4-triazole compounds of German Offenlengungsschrift No. 2,164,234 have the formula $$\begin{array}{c} \text{(I)} \end{array}$$

wherein
(a) R is hydrogen or alkyl with 1 to 4 carbons;
(b) $Z_1$ is hydrogen, alkyl with 1 to 18 carbons, aryl or alkaryl with 6 to 18 carbons; alkylenealkoxy or alkylenearyloxy with 2 to 18 carbons and nitrogen containing heterocyclic rings with 4 to 5 ring carbons and 1 or 2 ring nitrogens; or the residue

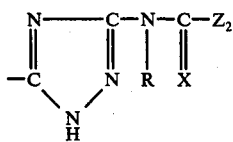

or the residue

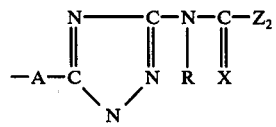

wherein A is alkylene with 1 to 8 carbons, (c) X is oxygen or sulphur;

(d) $Z_2$ is phenyl or naphthyl, which is substituted with one or two groups $R_1$ and 0 to 2 groups $R_2$, wherein (i) $R_1$ is —OH, —SH, —$SR_5$ ($R_5$ being alkyl or alkylenecarboxyalkyl with 1 to 4 carbons) or the residue

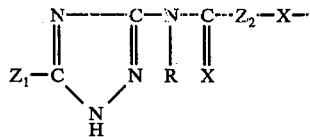

wherein X has the above mentioned meaning and at least one of the residues $R_1$ is located in the ortho-position;

(ii) $R_2$ is alkyl, phenyl, alkylphenyl, alkoxy, acyl

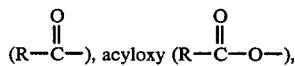

phenyloxy, alkylphenyloxy with 1 to 18 carbons, halogen, an amino group (—$NH_2$) or the residue

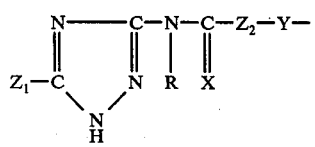

wherein Y is oxygen, sulphur or a residue

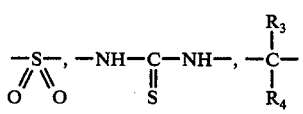

wherein $R_3$ and $R_4$ are hydrogen or alkyl with 1 to 3 carbons; with the proviso that at most two 1,2,4-triazole groups are contained in the whole molecule, and when $Z_2$ is phenyl, the compounds have formula II

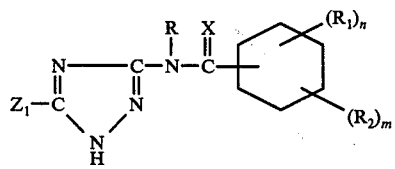

wherein n is 1 or 2 and m is 0, 1 or 2, and when $Z_2$ is naphthyl, the compounds have the formula III

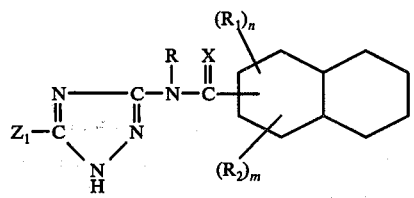

wherein n and m have the same meaning as in formula II.

Examples for R— as well as $R_2$—, $R_3$—, $R_4$—, $R_5$— and $Z_1$ as alkyl are methyl, ethyl, propyl, isopropyl, n-butyl, sec-butyl, tert-butyl, pentyl, hexyl, heptyl, n-octyl, iso-octyl, nonyl, decyl, undecyl, dodecyl, n-tetradecyl, n-hexadecyl, and n-octadecyl.

Examples for $Z_1$-alkaryl groups are tolyl, methylnaphthyl, xylyl, 2,4,6-trimethylphenyl (mesityl), ethylphenyl, dodecylphenyl, nonylphenyl, and hexylphenyl.

Examples for A as alkylene are ethylene, propylene, hexylene, octylene, butylidene, butylene, ethylidene, propylidene, isopropylidene, isobutylidene and pentylene.

Examples for the $SR_5$— groups are thiomethyl, thioethyl, thiopropyl and thiobutyl, thioethylenecarboxyethyl, thiomethylenecarboxymethyl and thiopropylenecarboxymethyl.

Examples for the halogens are fluorine and chlorine.

Examples for $R_2$ as acyl and acyloxy are propionyl, butyryl, acetyloxy, propionyloxy, and butyryloxy, myristoyl (tetradecoyl), myristoyloxy (tetradecoyloxy), stearoyl (octadecoyl) stearoyloxy (octadecoyloxy), dodecoyl and dodecoyloxy.

Examples for $Z_1$ as alkylenealkoxy and alkylenearyloxy are ethyleneoxyethyl, methyleneoxybutyl, ethyleneoxypropyl, methyleneoxyhexadecyl, propyleneoxyhexyl, methyleneoxyphenyl, ethyleneoxybenzyl, ethyleneoxyxylyl, propyleneoxy-2,4,6-trimethylphenyl, and ethyleneoxyphenylethyl.

Examples for $Z_1$ as heterocyclic groups are pyridyl, piperidyl, pyrrolyl, and pyrazolyl, pyrimidyl, pyrazinyl and pyridazinyl.

Examples for $Z_1$ as aryl are phenyl and naphthyl.

An example of a preferred compound from German Offenlegungsschrift 2,164,234 is

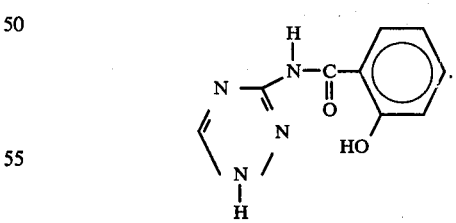

A twenty-first useful class of compounds are disclosed in U.S. Pat. No. 3,629,189 and have the formula

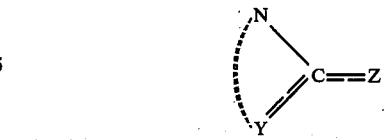

wherein

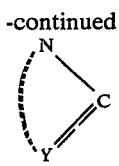

represents a heterocyclic ring structure which includes at least one five or six membered ring, the ring atoms being carbon, nitrogen, and Y; Y is selected from the group consisting of nitrogen, carbon or sulfur; and Z is selected from the group consisting of

 (1)

$R_1$ is selected from the group consisting of hydrogen, alkyl having from one to about eighteen carbon atoms, aryl and

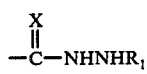

wherein $R_2$ is selected from the group consisting of —$R_3$ and $HSR_4$—

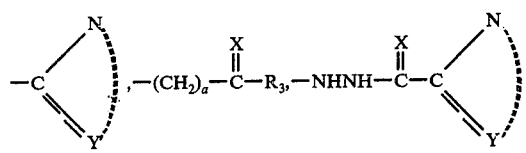

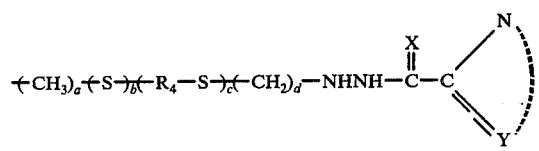

and

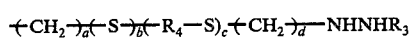

wherein
$R_3$ is alkyl having from one to about eighteen carbon atoms, aryl, benzyl and hydroxyaryl,
a, b and d are 0, 1 or 2,
$R_4$ is alkylene having from one to six carbon atoms or arylene, and
c is 0 or 1;

 (2)

$R_5$ is

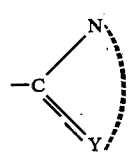

or —N=$CHR_6$, wherein
$R_6$ is selected from the group consisting of $R_3$,

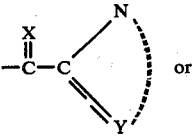 (3)

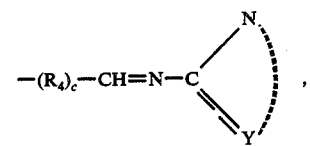

or

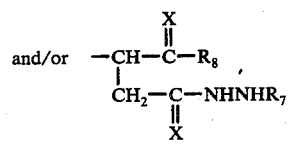

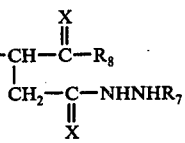 and/or 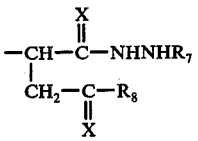, wherein
$R_8$ is selected from the group consisting of aryloxy, alkoxy or —$NHNHR_7$ and

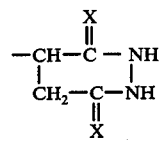

or

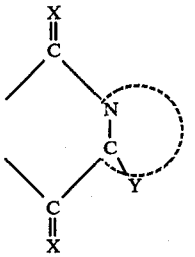

can form a ring

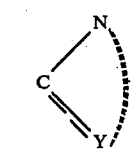

$R_7$ is selected from the group consisting of hydrogen and $R_3$ and
X in each of the above formulae is selected from the group consisting of oxygen and sulfur.
Typical heterocyclic ring structures include pyrrole, pyridine, pyrrolizine, pyrrolidone, pyrrolone, pyrazine, quinoline, triazole, imidazole, tetrazole, imidazoline, imidazolidine, imidazolone, benzoimidazole, benzoimidazolone, pyrazole, pyrazolone, indazole, thiazole, pyridazine, pyrimidine, quinolizine, pyrazine, piperazine, triazine, tetrazine, indole, indoline, benzothiazole, benzopyrazole, indolenine, and isothiazole; the preferred heterocyclic ring structures are 2-pyrrolidone 5-carboxylic acid derivatives.

Typical $R_1$ and $R_3$ alkyl groups include methyl, ethyl, propyl, isopropyl, n-butyl, sec-butyl, tert-butyl, pentyl, hexyl, heptyl, n-octyl, iso-octyl, nonyl, decyl, undecyl, and dodecyl; typical $R_1$, $R_3$ aryl groups include phenyl and naphthyl; typical $R_3$ hydroxyaryl groups include hydroxyphenyl and hydroxynaphthyl; typcial $R_8$ alkoxy groups include methoxy, ethoxy, propoxy, hexyloxy, and lauryloxy; and typical $R_8$ aryloxy groups include phenoxy and methylphenoxy.

Examples of preferred compounds from U.S. Pat. No. 3,629,189 are

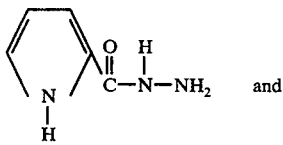 and

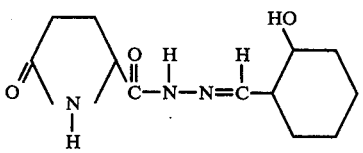

A twenty-second useful class of compounds are thiodipropionic and thiodiglycolic acid hydrazides of the formula

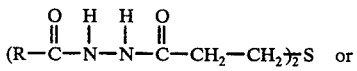 or

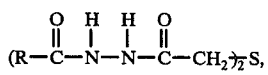

in which R is linear or branched alkyl, cycloalkyl, aryl or aralkyl which may be substituted by alkyl, hydroxy, alkoxy and halogen. R as aryl is preferably phenyl or naphthyl, R as aralkyl is preferably benzyl, R as alkyl has preferably 1 to 18 carbons, and R as alkylphenyl is preferably substituted in the 2- or 4-position and has 7 to 14 carbons. R is most preferably alkyl with 1 to 18 carbons, cyclohexyl, benzyl, phenyl, orthohydroxyphenyl and naphthyl.

An example of a preferred compound from the above class of compounds is

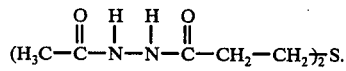

The compounds of classes 13 – 22 are prepared according to procedures well-known in the art.

According to the present invention therefore, there is provided a method of bonding a vulcanizable elastomeric composition to a metal surface during vulcanization which comprises adding to a vulcanizable elastomeric composition a metal deactivating compound as previously defined in an amount of from 0.05 to 10 percent by weight based on the weight of the elastomer, and preferably from 0.1 to 5.0 percent, and vulcanizing the composition while it is in contact with the metal surface to provide a strong and durable bond. There is further provided a product of the method described in this paragraph.

According to the present invention, there is also provided a composition which comprises vulcanizable elastomer, a vulcanizing agent, and a metal deactivating compound as previously defined in an amount of from 0.05 to 10 percent by weight based on the weight of the elastomer, and preferably from 0.10 to 5.0 percent.

The vulcanizable elastomeric composition may be produced by mixing the ingredients of the composition in the normal manner in an internal mixer, for example, an extruder, a Banbury mixer and/or on a two-roll mill. After mixing, the composition may be applied to a metal surface and vulcanized. After application to the metal surface, the composition is normally vulcanized at a temperature of from 140° C to 180° C. The time of vulcanization may be varied according to the vulcanization temperature and the properties desired in the vulcanizate, as is known in the art.

The additives of this invention can be used with any vulcanizable elastomer. All natural and/or synthetic rubbers are usable in the present invention. Such elastomers include polydienes such as polybutadiene or polyisoprene, including natural rubber; copolymers of dienes such as butadiene or isoprene with other copolymerizable monomers such as styrene, alpha-methylstyrene, an acrylic ester, methylisopropenylketone, isobutylene, acrylonitrile or an unsaturated carboxylic acid; halogenated rubbers such as polychloroprene or fluororubbers; interpolymers of one or more monolefins with a monomer which confers unsaturation on the interpolymer, for example, an unsaturated ethylene/propylene interpolymer such as an ethylene/propylene/dicyclopentadiene terpolymer; sulphur-vulcanizable polyurethane rubbers; butyl rubber containing at least 0.8% unsaturation; and combinations of the above elastomers, e.g., natural rubber/butadiene-styrene copolymer blends, a mixture of a saturated copolymer of ethylene and propylene with an unsaturated interpolymer of ethylene, propylene and a monomer comprising unsaturation in the interpolymer, etc.

In addition to the metal deactivating compounds previously defined, the compositions of this invention may contain other conventional additives including accelerators, activators, anti-cracking agents, antioxidants, antiozonants, anti-scorching agents, antistatic agents, dispersing agents, extruders, fillers, internal lubricants, plasticizers and softeners, processing aids, retarders, tackifiers, vulcanizing agents, pigments, etc. These conventional ingredients and additives are added to the elastomeric material in suitable amounts in known manners to provide a vulcanizable composition based on the selected elastomer.

The additives of this invention can also be used in combination with conventional adhesion promoters, such as those described in *Compounding for Wire Adhesion*, M. P. Wagner, Automobile Engineering Meeting, Detroit, Michigan, May 1973. Examples of such conventional adhesion promoters are cobalt compounds, such as cobalt naphthenate, the "HRH" system composed of hydrated silica, resorcinol, and hexamethylenetetramine and newer modifications of the HRH system employing alternate resin formers to the resorcinol and hexamethylenetetramine system. An effective alternate is composed of hexamethoxymethylmelamine and a partially polymerized resorcinol-formaldehyde resin. Often combinations of adhesion promoters such as these will produce superior results in certain applications to those expected from the properties of the individual components.

Metal organo compounds, especially nickel organo compounds, may also be used in combination with the additives of this invention. Examples of such nickel organo compounds are presented in U.S. Pat. No. 3,905,947.

It has been found that a particularly useful adhesion promoter system is obtained by combining the additives of this invention with an adhesive system produced from the reaction of a methylene acceptor and a methylene donor reactable therewith. The methylene donor contains at least one 3 valent nitrogen connected to at least one $CH_2$ radical and is capable of generating methylene groups in the presence of the methylene acceptor. It is suggested that the methylene donor in the presence of heat yields methylene either as formaldehyde or as methylene radical, which is reactable with the methylene acceptor to produce a resinous matrix in the rubber while at the same time promoting desirable adhesion between metal and rubber surfaces (See U.S. Pat. No. 3,517,722).

Examples of methylene donor/methylene acceptor systems which are useful in combination with the adhesion promoters of this invention are presented in U.S. Pat. No. 3,517,722. Examples of suitable methylene donors disclosed in this reference are n-(substituted oxymethyl) derivatives of 1,3-imidazolidine-2-ones and 1,3-imidazolidine-2-thiones, N-(substituted oxymethyl) derivatives of hydantoin, N-(substituted oxymethyl) derivatives of melamine, an N-(substituted oxymethyl) carboxylic acid amide, an N-(substituted oxymethyl) cyclicimide, a 5-substituted-1-aza-3,7-dioxabicyclo-[3,3,0] octane, trimeric methyleneamino acetonitrile, and an azomethine of the general formula

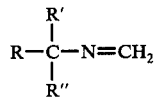

wherein R, R' and R" are lower alkyl (1 to 8 carbons) radicals, such as 5-methylol-1-aza-3,7-dioxabicyclo[3,3,0]-octane, N-t-butyl azomethine, 1,3-dimethylol-2-imidazolidinone, hexakis (methoxymethyl) melamine, N-t,t-octyl azomethine, and 5-methyl-1-aza-3,7-dioxabicyclo[3,3,0] octane. Examples of suitable methylene acceptors disclosed in U.S. Pat. No. 3,517,722 are m-disubstituted benzenes wherein the substituents are selected from the group consisting of OH, $NH_2$ and —O-$COCH_3$, such as resorcinol and m-aminophenol.

Particularly valuable adhesion promoters result from the combination of the additives of this invention with methylene donor/methylene acceptor systems selected from the HRH adhesive system and those "HRH" systems wherein melamine resins replace hexamethylenetetramine (hexa). Suitable melamine substitutes for hexa include dimethylolmelamine, trimethylolmelamine, partially etherified trimethylolmelamine, fully etherified hexamethylolmelamine, (hexamethoxymethylmelamine) and fully etherified tetra-methylolenzoquanamine, especially hexamethoxymethylmelamine.

The most well-known methylene acceptor for these "HRH" type systems is resorcinol. Other methylene acceptors based on resorcinol are available. Many condensation products of resorcinol and formaldehyde are available commercially as adhesion promoters and can be used as methylene acceptors in this invention. Beta-naphthol (2-nephthol) is another methylene acceptor which serves as an excellent alternative to resorcinol or resorcinol-based resins.

The methylene donors and methylene acceptors are added to the vulcanizable elastomer in amounts sufficient in combination with the metal deactivating compounds of the invention to improve the adhesion between metal and elastomer. A suitable concentration of methylene donor is between about 0.05 percent to about 10 percent by weight based on the weight of the elastomer. An amount of methylene acceptor within the range from about 0.05 percent to 10 percent by weight based on the weight of the elastomer is similarly satisfactory. Preferably, from 0.1 to 5.0 percent of each is employed.

As noted above, an especially valuable coadhesion promoter for use with the metal deactivators of the invention is the HRH system composed of a siliceous filler, resorcinol and hexamethylenetetramine. Fillers with high specific surface areas, such as precipitated silica and silicates, exhibit the most activity. The filler may be present in an amount from about 10 to 80 percent by weight based on the weight of the elastomer. Preferably, at least 15 phr filler are added.

The amount of hexamethylenetetramine and resorcinol can each vary from 0.05 to 10 phr. The optimum amount will, however, vary from one system to another and should be determined by experiment. Ranges of hexamethylenetetramine (hexa) of from 1.0 to 3.0 phr and of resorcinol of from 1.5 to 5.0 phr provide good bench marks for such experimentation. Satisfactory HRH systems can be formulated using at least 15 phr of siliceous filler, 2.5 phr of resorcinol and 1.6 phr of hexamethylenetetramine.

The hexa is preferably micronized in the subsieve range fro use in the HRH system. Commercial hexa grades of this type are available, either mixed with an additive for free flow or masterbatched into rubber or oil. Two ways of handling the resorcinol are to melt it into the system or to disperse it in a finely-ground form. Finely divided, easily dispersible grades of resorcinol are commercially available as such or dispersed in various carriers.

In addition to the metal deactivating compounds and the siliceous filler, resorcinol and hexamethylenetetramine of the HRH system, the compositions may contain other conventional compounding ingredients including zinc oxide, stearic acid, process oils including aromatic and naphthenic oils, tackifiers, plasticizers, extenders, accelerators and carbon blacks. These conventional compounding ingredients and additives are added to the elastomeric material in suitable amounts in known manners to produce a vulcanizable composition based on the selected elastomer.

The vulcanizable compositions which may be bonded by the method of the present invention will preferably contain carbon black. The amount of carbon black included will depend upon the desired nature of the product, since although the hardness is increased by increased amounts of carbon black, the resilience of the rubber, when vulcanized, is reduced. Preferably, however, the amount of carbon black in the rubber is from 25 to 80 parts by weight of carbon black per 100 parts by weight of the elastomer in the compositions.

The use of sulphur as vulcanizing agent is preferred, since this ingredient is known to be capable of facilitating the bonding between the elastomeric composition and metals, and in particular, brass or zinc plated metals. The amount of sulphur in the synthetic rubber composition may be from 0.1 to 25 parts by weight, preferably from 0.5 to 10 parts by weight, per 100 parts by weight of the vulcanizable elastomer. The use of compounds according to the invention allows a low content of sulfur in the rubber composition and the reinforced rubber remains permanent, also at higher temperatures.

Examples of accelerators useful in the invention are mercaptobenzothiazole or N-cyclohexylbenzothiazole-2-sulphenamide which may be present in an amount of, for example, from 0.1 to 6.0 parts by weight per 100 parts by weight of the elastomer.

The metals to which the elastomeric composition is to be bonded include iron, steel, cobalt, nickel, copper, zinc, titanium, vanadium, chromium, tin and mixtures of the above, more specifically brass and bronze. The preferred metals of this invention are steel or brass, bronze or zinc plated metals. It is not necessary for the surface of the metal to be roughened before the composition is applied since the bond between the composition and the metal is not a mechanical one. However, it is preferred to free the metal surface of grease and dirt before the composition is applied.

The following examples, presented for illustration and not limitation, will further serve to typify the nature of the present invention.

EXAMPLE 1

Bonding of Natural Rubber to Brass Plated Steel Wire (a) Preparation of Natural Rubber Stock One hundred parts of natural rubber (SMR5L, Standard Malaysian Rubber Grade 5L) were placed in a size B Banbury Mixer preheated to about 43,3° C and having a rotor speed of 116 rpm. After 0.5 minutes of mixing, 1.00 part stearic acid plus 5.00 parts of tackifier (Piccovar 420, mixed aromatic resines) were added. After mixing for an additional minute, 50.00 parts of carbon black (Continex FEF (N-550) Fast Extrusion Furnace Type) were added in two equal portions. The two portions were added after 1.5 and 2.5 minutes of total mixing time. Zinc oxide, 1.00 part, was added after 3.5 minutes of total mixing time and the mix was swept down after 4.5 minutes of total mixing time. After mixing for an additional 1.5 minutes to make a total of 6 minutes, the entire mix was dumped at a temperature of about 160° C.

(b) Sample Preparation

The stock obtained after Banbury mixing was cut into smaller samples, ranging in size from 50 to 100 grams, which were subsequently milled on a two-roll mill at 71,1° C for seven minutes, during which time 2.00 parts of sulfur, 0.75 part accelerator (SANTOCURE NS, N-tert.-butyl-2-benz azolesulfonamid) and 1.60 parts of the additive compound were added. After 7 minutes of milling, the stock was sheeted.

The sheeted stock was cut into 0.5 × 8.0 inch strips and stacked to form two strips each weighing approximately 16 grams. The strips were freshened (lightly washed) with n-hexane prior to being placed in a curing mold.

The mold was preheated in a hydraulic compression press maintained at 143,3° C for a minimum of three minutes. The mold was removed from the press, and loaded according to the following sequence: brass support plate (8 inches × 0.5 inch × 0.062 inch), rubber strip, brass plated steel wire sample, rubber strip, brass support plate and top plate of mold. The sample was cured for 23 minutes at 143,3° C under a ram force of 10 432,63 kilo ponds. After the 23 minute curing time, the mold was removed from the press and the rubber sample containing both the support plates and wire was removed from the mold and allowed to cool to ambient temperature (~22° F).

A description of the above sample preparation procedure is found in ASTM Test D2229-68.

(c) Testing Method

After standing at ambient temperature for 18 to 24 hours, the wires were pulled from the rubber stock using an Instron Testing machine, in accordance with the testing procedure set forth in ASTM test 2229-68, but with the modifications described in A. E. Hicks, et al in *Rubber Chemistry and Technology*, 45, 26–48 (1972).

(d) Test Results

The test results reported below were obtained according to the procedures described above. Pull-Out Force in the Table is the average force required to pull the wire from 1 antimeter of rubber. The blank value is the average force required to pull the wire from a formulation containing all of the ingredients except the additive compound. All formulations with the same stock designation number were prepared from the same rubber stock.

TABLE I

Adhesion of Natural Rubber to Brass Plated Steel Wire

| Additive Compound | Stock Designation | Pull-Out Force (kp/cm) |
|---|---|---|
| ⟨⟩-C(H)=N-NH-C(=O)-⟨⟩ with OH, HO | 1 | 10,0 |
| Blank | 1 | 5,85 |
|  | 2 | 11,0 |
| [⟨⟩-C(H)=N-NH-C(=O)-]₂ with OH | | |
| Blank | 2 | 7,24 |

TABLE I-continued

Adhesion of Natural Rubber to Brass Plated Steel Wire

| Additive Compound | Stock Designation | Pull-Out Force (kp/cm) |
|---|---|---|
| 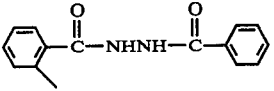 | 3 | 12,5 |
| 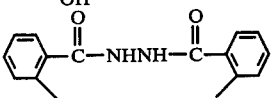 | 3 | 15,0 |
| 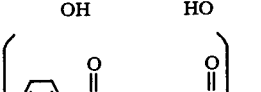 | 3 | 14,6 |
|  | 3 | 11,05 |
| Blank | 3 | 10,3 |
| 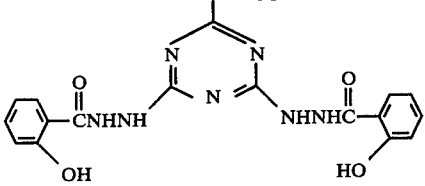 | 4 | 9,26 |
| 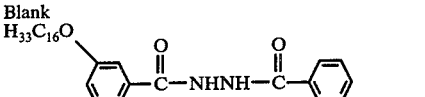 | 4 | 10,0 |
| Blank | 4 | 7,14 |

EXAMPLE 2

Bonding of Styrene-Butadiene Copolymer (SBR) to Brass Plated Steel Wire (a) Preparation of Styrene-Butadiene Copolymer Stock One hundred and fifty parts of a SBR Master-batch #1605 (Ashland Chemical) containing 100.00 parts SBR and 50.00 parts carbon black FEF (N-550) were placed in a size B Banbury Mixer, initially heated to about 21,1° C and having a rotor speed of 116 rpm. After mixing for 0.5 minutes, 2.82 parts of zinz oxide and 0.71 parts of Age-Rite Resin D (2,2,4-trimethyl-1,2-dihydroquinoline polymers as antioxidant) were added and mixed for another minute. Stearic acid, 0.71 part, was then added and mixed for an additional 2.5 minutes, then swept down and the mixing continued for 2 more minutes for a total mixing time of 6 minutes, at which time the entire mix was dumped at a temperature of about 173,6° C.

(b) Sample Preparation

The stock obtained after Banbury mixing was cut into smaller samples, ranging in size from 50 to 100 grams. These were subsequently milled on a two roll mill at 82,2° C for 7 minutes during which time 1.24 parts of sulfur, 0.64 part of Santocure NS, 0.14 parts of tetramethylthiuram monosulfide and either 1.00 part or 1.60 of the additive compound were added. After 7 minutes of milling, the stock was sheeted.

The sheeted stock was cut into 0.5 × 8.0 inch strips and stacked to form two strips each weighing approximately 16 grams. The strips were freshened (lightly washed) with n-hexane prior to being placed in the curing mold.

The mold was preheated in a hydraulic compression press maintained at 148,9° C for a minimum of 3 minutes. The mold was removed from the press and loaded according to the following sequence: brass support plate (8 inches × 0.5 inch × 0.062 inch), rubber strip, brass plated steel wire samples, rubber strip, brass support plate and top plate of mold. The sample was cured for 24 minutes at 300° F under a ram force of 10 432,63 kilo ponds. After the 24 minutes curing time, the mold was removed from the press and the rubber sample containing both the support plates and wires were removed from the mold and allowed to cool to ambient temperature (~22° C).

A description of the above sample preparation procedure is found in ASTM Test D2229-68.

(c) Test Method

After standing at ambient temperature for 18 to 24 hours, the wires were pulled from the rubber stock using an Instron Testing machine according to ASTM Test 2229-68 but including the modifications described by A. E. Hicks, et al in *Rubber Chemistry and Technology*, 45, 26-48 (1972).

(d) Test Results

The test results reported below were obtained according to the procedures described above. Pull-Out Force in the Table is the average force required to pull the wire from 1 centimeter of rubber. The blank value is the average force required to pull the wire from a formulation containing all of the ingredients except the additive compound. All formulations with the same stock designation number were prepared from the same rubber stock.

grams. The strips were freshened (lightly washed) with n-hexane prior to being placed in the curing mold.

The mold was preheated in a hydraulic compression press maintained at 300° F for a minimum of 3 minutes.

TABLE II

Adhesion of SBR to Brass Plated Steel Wire

| Additive Compound | Concentration phr | Stock Designation | Pull-Out Force (kp/cm) |
|---|---|---|---|
| 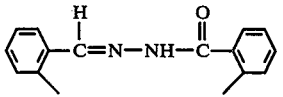 | 1.00 | 1 | 12,06 |
| 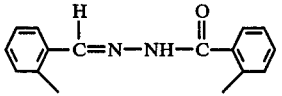 | 1.60 | 1 | 15,2 |
| Blank | | 1 | 5,92 |
| 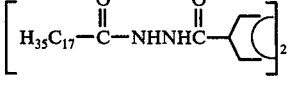 | 1.00 | 2 | 8,56 |
| Blank | | 2 | 5,98 |

EXAMPLE 3

Bonding of Ethylene-Propylene Terpolymer (EPDM) Rubber to Brass Plated Steel Wire (a) Preparation of EPDM Rubber Stock The EPDM Rubber Stock was prepared by placing 100.00 parts of EPDM rubber (EPSYN 40A from Copolymer) in a size B Banbury Mixer preheated to about 48,9° C and having a rotor speed of 116 rpm. After mixing for 0.5 minute, 1.00 part of stearic acid was added and mixed for another 0.5 minute. One-half of 150.00 parts of carbon black FEF (N-550) was then added and mixed for an additional 0.5 minute. Then the remaining one-half of the carbon black, 5.00 parts of zinc oxide and 100.00 parts of process oil (Flexon 580, naphthenic oils) were added, the stock was mixed for another 4.5 minutes and then dumped. The total mixing time was 6 minutes and the dump temperature was about 167,8° C.

(b) Sample Preparation

The Banbury mixed stock was cut into smaller samples, ranging in size from 50 to 100 grams. These were milled on a two roll mill at 82.2° C for 7 minutes during which time 1.50 parts of sulfur, 1.50 parts of tetramethylthiuram monosulfide, 0.50 part mercaptobenzothiazole and either 1.00 part or 1.60 parts of the additive compound were added. After 7 minutes of milling, the stock was sheeted.

The sheeted stock was cut into 0.5 × 8.0 inch strips and stacked to form two strips each weighing about 16 grams. The strips were freshened (lightly washed) with n-hexane prior to being placed in the curing mold.

The mold was removed from the press and loaded according to the following sequence: brass support plate (8 inches × 0.5 inch × 0.062 inch), rubber strip, brass plated steel wire samples, rubber strip, brass support plate and top plate of mold. The sample was cured for 32 minutes at 300° F under a ram force of 10 432,63 kilo ponds. After the 32 minutes curing time, the mold was removed from the press and the rubber sample containing both the support plates and wires was removed from the mold and allowed to cool to ambient temperature (~22° C).

A description of the above sample preparation procedure is found in ASTM Test D2229-68.

(c) Test Method

After standing at ambient temperature for 18 to 24 hours, the wires were pulled from the rubber stock using an Instron Testing machine according to ASTM Test 2229-68, but including the modifications described by A. E. Hicks et al in *Rubber Chemistry and Technology*, 45, 26–48 (1972).

(d) Test Results

The test results reported below were obtained according to the procedures described above. Pull-Out Force in the Table is the average force required to pull the wire from 1 centimeter of rubber. The blank value is the average force required to pull the wire from a formulation containing all of the ingredients except the additive compound. All formulations with the same stock designation number were prepared from the same rubber stock.

TABLE III

Adhesion of EPDM Rubber to Brass Plated Steel Wire

| Additive Compound | Concentration phr | Stock Designation | Pull-Out Force (kp/cm) |
|---|---|---|---|
| 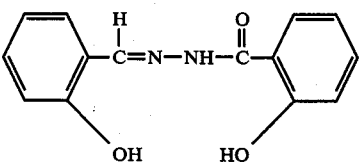 | 1.00 | 1 | 5,72 |

TABLE III-continued

Adhesion of EPDM Rubber to Brass Plated Steel Wire

| Additive Compound | Concentration phr | Stock Designation | Pull-Out Force (kp/cm) |
|---|---|---|---|
| [structure: benzaldehyde salicyloyl hydrazone — C=N−NH−C(=O) with OH and HO groups on phenyls] | 1.60 | 1 | 5,63 |
| Blank | | 1 | 1,14 |
| [H₃₅C₁₇−C(=O)−NHNH−C(=O)−]₂ | 1.00 | 2 | 2,59 |
| Blank | | 2 | 1,07 |

EXAMPLE 4

Bonding of Butyl Rubber to Brass Plated Steel Wire (a) Preparation of Butyl Rubber Stock The Butyl Rubber stock was prepared by placing 100.00 parts of butyl rubber (ENJAY 365) and 1.00 part of stearic acid in a size B Banbury Mixer at room temperature (22° C) and having a rotor speed of 155 rpm. After mixing for 0.5 minutes, one-half of 50.00 parts of carbon black FEF (N-550) was added and mixed for another 3 minutes. The remaining one-half of the carbon black, together with 5.00 parts of zinc oxide were added and then mixed for another 3 minutes. The mix was swept down, mixed for 2 more minutes and then dumped after a total mixing time of 8.5 minutes, at a temperature of about 171,1° C.

(b) Sample Preparation

The Banbury mixed stock was cut into smaller samples, ranging in size from 50 to 100 grams. These were subsequently milled on a two roll mill at 65,6° C for 8 minutes, during which time 0.50 parts of sulfur, either 1.00 part or 1.60 parts of the additive compound, and the accelerator system consisting of 3.00 parts Ethyl Tellurac and 1.00 part MBT (Thiofide) were added. After 8 minutes of milling, the stock was sheeted.

The sheeted stock was cut into 0.5 × 8.0 inch strips and stacked to form two strips each weighing about 16 grams. The strips were freshened (lightly washed) with n-hexane prior to being placed in the curing mold.

The mold was preheated in a hydraulic compression press maintained at 316° F for a minimum of 3 minutes. The mold was removed from the press and loaded according to the following sequence: brass support plate (8 inches × 0.5 inch × 0.062 inch), rubber strip, wiere samples, rubber strip, brass support plate and top plate of mold. The sample was cured for 22 minutes at 157,9° C under a ram force of 10 432,63 kilo ponds. After the 22 minutes curing time, the mold was removed from the press and the rubber sample containing both the support plates and wires was removed from the mold and allowed to cool to ambient temperature (22° C).

A description of the above sample preparation procedure is found in ASTM Test D2229-68.

(c) Testing Method

After standing at ambient temperature for 18 to 24 hours, the wires were pulled from the rubber stock using an Instron Testing machine according to ASTM Test 2229-68, including the modifications described by A. E. Hicks et al in *Rubber Chemistry and Technology*, 45, 26–48 (1972).

(d) Test Results

The test results reported below were obtained according to the procedures described above. Pull-Out Force in the Table is the average force required to pull the wire from 1 centimeter of rubber. The blank value is the average force required to pull the wire from a formulation containing all of the ingredients except the additive compound. All formulations with the same stock designation number were prepared from the same rubber stock.

TABLE IV

Adhesion of Butyl Rubber to Brass Plated Steel Wire

| Additive Compound | Concentration phr | Stock Designation | Pull-Out Force (kp/cm) |
|---|---|---|---|
| [structure: C=N−NH−C(=O) with OH and HO on phenyls] | 1.00 | 1 | 3,85 |
| [structure: C=N−NH−C(=O) with OH and HO on phenyls] | 1.60 | 1 | 4,56 |
| Blank | | 1 | 2,62 |

EXAMPLE 5

Adhesion of natural rubber to brass-plated steel wire (a) Manufacture of the natural rubber base mix Recipe:

| | | |
|---|---|---|
| SMR 5L (Standard Malaysion Rubber Grade 5L) | 100,0 parts | |
| Philblack N 550 (carbon black) | 60,0 parts | (Phillips Petroleum) |
| zinc oxide | 5,0 parts | |
| stearic acid | 1,0 parts | |
| Naftolen ZD (aromatic oil) | 5,0 parts | (Metallgesellschaft AG) |
| sulphur | 1,2 parts | |
| Vulkacit CZ/C (accelerator) | 0,8 parts | (Bayer) |
| Vulkacit Thiuram (accelerator) | 0,4 parts | (Bayer) |

The mixture was manufactured in a laboratory internal mixer (type LH 1, Werner & Pfleiderer) under the following conditions: bulk factor 1.1, kneading chamber temperature 40° C, speed 70 rpm.

| Mixing plan: | Time (in mins.) |
|---|---|
| 1. mastication of the rubber | 1.0 |
| 2. incorporation of stearic acid, ⅓ carbon black and ⅓ oil | 2.0 |
| 3. incorporation of zinc oxide, ⅓ carbon black and ⅓ oil | 2.0 |
| 4. incorporation of ⅓ carbon black and ⅓ oil | 2.0 |
| 5. final mixing | 0.5 |

The total mixing time was 7.5 minutes and the final temperature of the mixture 125° – 130° C.

The blending of the vulcanisation system was carried out on a roll mill type WNU 3 (Troester) (roller size: 200 × 450 mm) at a temperature of 40° C and a friction of 1:1,25 (speed ratio: 20:25).

The mixture obtained from the internal mixer was homogenised for 2 minutes on the roller and the vulcanisation system was then incorporated according to the following mixing cycle:

| | time (in mins.) |
|---|---|
| 1. rolling unit formation of sheet on the rolls | 3.0 |
| 2. incorporation of Vulkacit CZ/C and Vulkacit Thiuram | 2.0 |
| 3. 4 times cross blending on both sides | 1.0 |
| 4. incorporation of sulphur | 1.5 |
| 5. 4 times cross blending on both sides, running 5 times through narrow gap, drawing out sheet | 3.0 |
| total mixing time | 10.5 minutes |

(b) Manufacture of the test samples

The mixture obtained after incorporation of the vulcanisation system was divided into samples of 86.7 g. At a roller temperature of 40° C, 1.0 g of the additive was blended on a roll mill (roller size: 100 × 200 mm), corresponding to a concentration of 2.0 parts to 100 parts of rubber. Two strips measuring 0.5 × 8.0 ins. and each weighing about 16 g were cut from these mixtures. The brass-plated steel wire (construction 5 × 0.22 mm, 68.0% copper; NV-Bekaert SA) was washed in dichloromethane for 30 minutes shortly before the use and subsequently dried for 20 minutes. The vulcanisation mould was preheated in a hydraulic heating press for at least 3 minutes at 150° C and then filled in the following sequence: brass reinforcing plate (8 inches × 0.5 inch × 0.062 inch), rubber mix, brassplated steel wire, rubber mix, brass reinforcing plate and cover of the mould. The samples were vulcanised for 7 or 8 minutes at 150° C. The individual vulcanisation times resulted from $T_{95}$ of the Monsanto rheometer curves (time taken to attain 95% of the maximum torque) - they were between 5 and 6 minutes - plus an allowance of ⅓ $T_{95}$. Upon completion of the vulcanisation, the test samples were removed from the mould and stored at room temperature.

The manufacture of the samples is described in ASTM Test D 2229-73.

(c) Test Method

The test samples were stored at room temperature for 18 to 24 hours. The wires were then pulled out of the rubber block using a universal test machine RK 1000 (Roell & Korthaus KG) in conformity with ASTM Test D 2229-73 and taking into account the modifications described by A. E. Hicks in *Rubber Chemistry and Technology*, 45, pp. 26–48 (1972).

(d) Test Results

The following results were obtained on carrying out the tests by the methods described hereinabove. The pull-out force is the average force that is necessary to pull the wires out of a 1.0 cm thick rubber block and is indicated in kp/cm. The blank value is the average force that is necessary to pull the wires out of a 1.0 cm thick rubber block which contains all mixture components except the additive. The results are given in Table V.

TABLE V

Adhesion of Natural Rubber to Brass Plated Steel Wire

| A. Additive Compound (Concentration 2%) | Unaged Pull-Out-Force (kp/cm) (Factor) | Aged (7 days/100° C) Pull-Out-Force (kp/cm) (Factor) |
|---|---|---|
| Blank | 3.0 (1.0) | 1.7 (1.0) |
| $H_{35}C_{17}$–CO–NH–NH–CO–CO–NH–NH–CO–$C_{17}H_{35}$ | 4.2 (1.4) | 2.4 (1.4) |
| $H_7C_3$–CO–NH–NH–CO–CO–NH–NH–CO–C$_6$H$_5$ | 3.4 (1.1) | 2.8 (1.6) |
| $H_3C$–CO–NH–NH–CO–$(CH_2)_2$–CO–NH–NH–CO–$CH_3$ | 3.7 (1.2) | 3.5 (2.0) |
| $H_3C$–CO–NH–NH–CO–$(CH_2)_4$–CO–NH–NH–CO–$CH_3$ | 5.2 (1.7) | 3.7 (2.2) |
| Cl–(2,6-dichlorophenyl)–CO–NH–NH–CO–$(CH_2)_8$–CO–NH–NH–CO–(2,6-dichlorophenyl)–Cl | 1.6 (0.6) | 3.0 (1.8) |
| (–HO–(X,X-substituted phenyl)–$CH_2CH_2$–CO–NH–NH–CO–$CH_2CH_2$–)$_2$ | 4.7 (1.6) | 2.7 (1.6) |
| $H_5C_2$–CO–NH–NH–CO–(phenyl)–CO–NH–NH–CO–$C_2H_5$ | 5.1 (1.7) | 2.8 (1.7) |
| $H_3C$–CO–NH–NH–CO–NH–NH–CO–$CH_3$ | 6.3 (2.1) | 3.4 (2.0) |

4,077,948

TABLE V-continued
Adhesion of Natural Rubber to Brass Plated Steel Wire

| Structure | Col 1 | Col 2 |
|---|---|---|
| (salicylidene hydrazide dimer) | 8.1 (2.7) | 3.8 (2.3) |
| (bis-salicylidene oxalyl dihydrazide) | 4.5 (1.5) | — (—) |
| di-t-butyl-hydroxyphenyl propionyl hydrazide | 2.9 (1.0) | 2.6 (1.5) |
| di-t-butyl-hydroxyphenyl propionyl-C17H35 hydrazide | 8.0 (2.7) | 4.8 (2.8) |
| bis(di-t-butyl-hydroxyphenyl propionyl) hydrazide | 5.6 (1.9) | 3.3 (1.9) |
| bis(di-t-butyl-hydroxybenzoyl) hydrazide | 4.8 (1.6) | 2.8 (1.6) |
| di-t-butyl salicyloyl C17H35 hydrazide | 5.9 (2.0) | 2.6 (1.5) |
| 2-hydroxy-5-octyloxy benzoyl C17H35 hydrazide | 5.5 (1.8) | 2.9 (1.7) |
| 5-chloro salicyloyl C11H23 hydrazide | 5.2 (1.7) | — (—) |
| salicyloyl benzoyl hydrazide polymer *) | 5.7 (1.9) | — (—) |
| 2-propyl-4,6-bis(A-amino) triazine | 5.2 (1.7) | 2.5 (1.5) |
| 2-phenyl-4,6-bis(A-amino) triazine | 3.4 (1.1) | 1.5 (0.9) |
| 2-propoxy-4,6-bis(A-amino) triazine | 5.0 (1.6) | 3.0 (1.8) |

TABLE V-continued
Adhesion of Natural Rubber to Brass Plated Steel Wire
| Structure | Value 1 | Value 2 |
|---|---|---|
| 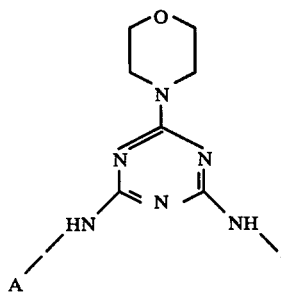 | 11.6 (3.8) | 5.2 (3.0) |
| 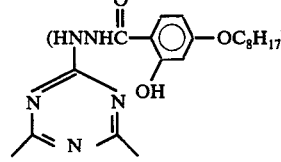 | 5.6 (1.9) | 2.6 (1.5) |
| 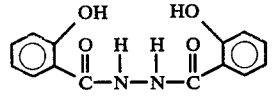 | 4.2 (1.4) | — (—) |
| 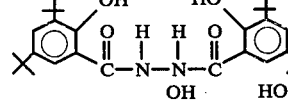 | 4.2 (1.4) | 1.7 (1.0) |
| 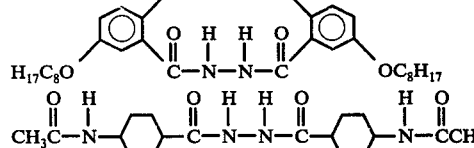 | 4.1 (1.4) | 2.6 (1.5) |
| 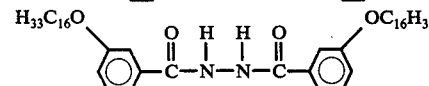 | 4.4 (1.5) | — (—) |
|  | 6.1 (2.0) | 3.6 (2.1) |
| 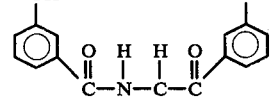 | 3.5 (1.2) | 2.2 (1.3) |
| 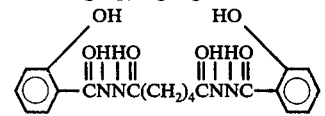 | 4.6 (1.6) | — (—) |
| 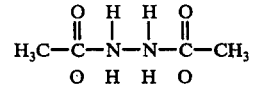 | 6.1 (2.0) | 2.6 (1.6) |
| 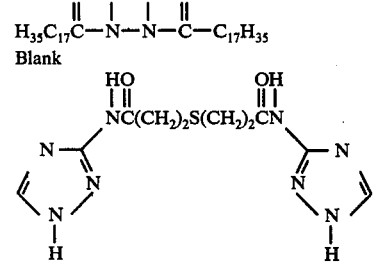 | 6.7 (2.2) | 3.2 (1.9) |
| Blank | 5.1 (1.7) | 3.0 (1.8) |
|  | 3.2 (1.1) | 2.3 (1.4) |
| 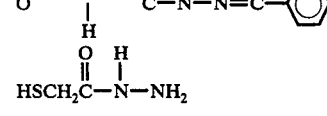 | 3.3 (1.1) | 2.8 (1.6) |

TABLE V-continued

Adhesion of Natural Rubber to Brass Plated Steel Wire

| Compound | Unaged | Aged |
|---|---|---|
| $H_3C$–$C(C_6H_{13})$=N–N(H)–C(OOH)=C(OOH)–N(H)–N=C($C_6H_{13}$)–$CH_3$ | 3.6 (1.2) | 2.5 (1.5) |
| Cyclohexyl–N=N(H)–C(=O)–C(=O)–N(H)–N=Cyclohexyl | 4.5 (1.5) | 3.5 (2.1) |
| Ph–CH=N–N(H)–C(=O)–C(=O)–N(H)–N=CH–Ph | 7.8 (2.6) | 5.0 (3.0) |
| $H_3C$–C(Ph)=N–N(H)–C(=O)–$(CH_2)_7$–C(=O)–N(H)–N=C(Ph)–$CH_3$ | 5.0 (1.7) | 1.5 (0.9) |
| $H_{13}C_6$–C(=O)–N(H)–N=Cyclohexyl | 3.3 (1.1) | 2.4 (1.4) |
| Ph–CH=N–N(H)–C(=O)–N(H)–N=CH–Ph | 3.3 (1.1) | 2.4 (1.4) |
| $H_7C_3$–CH=N–N(H)–C(=O)–C(=O)–N(H)–N=CH–$C_3H_7$ | 8.1 (2.7) | — (—) |
| $(H_3C)_2$C=N–N(H)–C(=O)–$C_6H_4$–C(=O)–N(H)–N=C$(CH_3)_2$ | 8.7 (2.9) | — (—) |
| Ph–C(=O)–N(H)–N=C$(CH_3)_2$ | 9.2 (3.1) | — (—) |
| Triazole–NH–C(=O)–$C_6H_4$(OH) | 8.7 (2.9) | 4.1 (2.4) |

*) A = –N(H)–C(=O)–$C_6H_4$(OH)

Table V - B.

| Additive Compound (Concentrations 1, 2 and 4%) | Series | Unaged Pull-Out-Force (kp/cm) (Factor) 1% | 2% | 4% | Aged (7 days/100° C) Pull-Out-Force (kp/cm) (Factor) 1% | 2% | 4% |
|---|---|---|---|---|---|---|---|
| Blank | 1 | | 2.9 (1.0) | | | 1.5 (1.0) | |
| | 2 | | 3.0 (1.0) | | | 1.7 (1.0) | |
| | 3 | | 3.2 (1.0) | | | 1.8 (1.0) | |
| 2-$SCH_3$–$C_6H_4$–CONH–NHCO–$C_6H_4$–$SCH_3$-2 | 3 | | 17.2 (5.7) | | | 6.9 (4.1) | |
| $H_3C$–C(=O)–N(H)–N(H)–C(=O)–$CH_3$ | 2 | 4.4 (1.5) | 5.5 (1.8) | 7.3 (2.4) | 2.4 (1.4) | 2.9 (1.7) | 7.4 |
| HO–$C_6H_2(X_2)$–$CH_2CH_2$–C(=O)–N(H)–N(H)–C(=O)–$CH_2CH_2$–$C_6H_2(X_2)$–OH | 2 | | 15.4 (5.1) | | | 4.5 (2.6) | |
| 2-OH–$C_6H_4$–CONHNHCOCH$_3$ | 2 | | 6.4 (2.1) | | | 3.0 (1.8) | |
| $H_{35}C_{17}$CONHNH$_2$ | 3 | | 2.8 (0.9) | | | 2.0 (1.1) | |

Table V - B.-continued

| Additive Compound (Concentrations 1, 2 and 4%) | Series | Unaged Pull-Out-Force (kp/cm) (Factor) 1% | 2% | 4% | Aged (7 days/100° C) Pull-Out-Force (kp/cm) (Factor) 1% | 2% | 4% |
|---|---|---|---|---|---|---|---|
| Ph—CONHNH₂ | 3 | | 3.5 (1.2) | | | 2.5 (1.5) | |
| 2-HO-C₆H₄—CH=NNH₂ | 3 | | 11.5 (3.8) | | | 4.0 (2.4) | |
| 3-CH₃-2-HO-C₆H₃—CONH—N=CH—C₆H₄-2-OH | 2 | | 4.2 (1.4) | | | 2.0 (1.1) | |
| 5-OCH₃-2-HO-C₆H₃—CONH—N=CH—C₆H₃-2-OH-5-OC₆H₁₃ | 2 | | 4.7 (1.6) | | | 2.6 (1.5) | |
| Ph—CONH—N=C(CH₃)₂ | 3 | | 10.1 (3.4) | | | 4.7 (2.3) | |
| 2-HO-C₆H₄—CONH—N=C(CH₃)₂ | 1 | 3.3 (1.1) | | | 2.1 (1.1) | | |
| | 2 | 5.4 (1.8) | | | 2.5 (1.5) | | |
| " | 2 | | 5.1 (1.7) | | | 2.2 (1.3) | |
| " | 2 | | 6.8 (2.3) | | | 3.0 (1.8) | |
| " | 1 | | | 5.4 (1.8) | | | 2.4 |
| " | 2 | | | 5.4 (1.8) | | | 2.5 |
| 2-HO-C₆H₄—CONH—N=CH—CH(CH₃)₂ | 3 | | 6.7 (2.2) | | | 4.7 (2.8) | |
| (sec-Bu, neopentyl)-2-HO-C₆H₂—CONH—N=CH—C₆H₄-2-OH | 2 | | 2.6 (0.9) | | | 2.1 (1.2) | |
| H₃₅C₁₇—C(O)—NH—NH—C(O)—NH—NH—C(O)—C₁₇H₃₅ | 3 | | 13.7 (4.6) | | | 4.9 (2.9) | |
| H₃C—C(O)—NH—NH—C(O)—CH₂—C(O)—NH—NH—C(O)—CH₃ | 1 | | 2.0 (0.7) | | | 1.9 (1.1) | |
| H₃C—C(O)—NH—NH—C(O)—(CH₂)₂—C(O)—NH—NH—C(O)—CH₃ | 1 | | 3.9 (1.3) | | | 2.1 (1.2) | |
| H₃C—C(O)—NH—NH—C(O)—(CH₂)₄—C(O)—NH—NH—C(O)—CH₃ | 1 | | 2.9 (1.0) | | | 1.8 (1.0) | |
| H₇C₃—CH=N—NH—C(O)—C(O)—NH—N=CH—C₃H₇ | 1 | 3.1 (1.0) | | | 2.4 (1.4) | | |
| | 2 | 3.9 (1.3) | | | 2.9 (1.7) | | |
| " | 1 | | 3.5 (1.2) | | | 3.5 (2.1) | |
| " | 2 | | 3.8 (1.3) | | | 3.6 (2.1) | |
| " | 1 | | | 6.8 (2.3) | | | 6.3 |
| " | 2 | | | 13.8 (4.6) | | | 7.3 |
| 5-CH₃-2-HO-C₆H₃—CH=N—NH—C(O)—C(O)—NH—N=CH—C₆H₃-2-OH-5-CH₃ | 2 | | 12.0 (4.0) | | | 5.2 (3.0) | |

Table V - B.-continued

| Additive Compound (Concentrations 1, 2 and 4%) | Series | Unaged Pull-Out-Force (kp/cm) (Factor) | | | Aged (7 days/100° C) Pull-Out-Force (kp/cm) (Factor) | | |
|---|---|---|---|---|---|---|---|
| | | 1% | 2% | 4% | 1% | 2% | 4% |
| Cl—⌬—OH  H O O H  HO—⌬—Cl<br>CH=N—N—C—C—N—N=CH | 2 | | 6.0 (2.0) | | | 2.8 (1.6) | |
| H₃C\C=NNHCO—⌬—CONHN=C/CH₃<br>H₃C/                              \CH₃ | 1<br>2 | 3.7 (1.2)<br>5.2 (1.7) | | | 2.1 (1.2)<br>2.7 (1.6) | | |
| " | 1 | 4.9 (1.6) | | | 1.6 (1.0) | | |
| " | 2 | 8.8 (2.9) | | | 3.6 (2.1) | | |
| " | 1 | | | 10.6 (3.5) | | | 3.6 |
| " | 2 | | | 10.9 (3.6) | | | 3.9 |
| " | 1 | 5.2 (1.7) | | | 3.3 (1.9) | | |
| ⌬—CONHNH—[triazine structure]—NHNHCO—⌬<br>(N═C—NHCOCH₂)₂S<br>HC  N<br>\N/<br>H | 2 | 3.1 (1.0) | | | 2.3 (1.4) | | |

EXAMPLE 6

Adhesion of Styrol Butadiene-Copolymer (SBR) to brass-plated steel wire (a) Manufacture of the SBR base mix Recipe:

| | | | |
|---|---|---|---|
| Buna Huls S 1502 | 100.0 | parts | (Chemische Werke Huls) |
| Philblack N 550 (carbon black) | 50.0 | parts | (Philips Petroleum) |
| zinc oxide | 5.0 | parts | |
| stearic acid | 2.0 | parts | |
| Naftolen ZD (aromatic oil) | 5.0 | parts | (Metallgesellschaft AG) |
| sulphur | 1.75 | parts | |
| Vukacit NZ (accelerator) | 1.0 | parts | (Bayer) |
| Vulkacit Thiuram (accelerator) | 0.2 | parts | (Bayer) |

The mixture was manufactured in a laboratory internal mixer (type LH 1, Werner & Pfleiderer) under the following conditions: bulk factor 1.1, kneading chamber temperature 50° C, speed 70 rpm.

| Mixing plan: | Time (in mins.) |
|---|---|
| 1. mastication of the rubber | 0,5 |
| 2. incorporation of stearic acid, ⅓ carbon black and ⅓ oil | 1,5 |
| 3. incorporation of zinc oxide, ⅓ carbon black and ⅓ oil | 1,5 |
| 4. incorporation of ⅓ carbon black and ⅓ oil | 1,5 |
| 5. final mixing | 0,5 |

The total mixing time was 5.5 minutes and the final temperature of the mixture 125° C.

The blending of the vulcanisation system was carried out on a roll mill type WNU 3 (Troester) (roller size: 200 × 450 mm) at a temperature of 50° C and a friction of 1:1,25 (speed ratio: 20:25).

The mixture obtained from the internal mixer was homogenised for 2 minutes on the roller and the vulcanisation system was then incorporated according to the following mixing cycle:

| | time (in mins.) |
|---|---|
| 1. rolling until formation of sheet on the rolls | 2.0 |
| 2. incorporation of Vulkacit CZ/C and Vulkacit Thiuram | 2.0 |
| 3. 4 times cross blending on both sides | 1.0 |
| 4. incorporation of sulphur | 1.5 |
| 5. 4 times cross blending on both sides, running 5 times through narrow gap, drawing out sheet | 3.0 |
| total mixing time | 9,5 minutes |

(b) Manufacture of the test samples

The mixture obtained after incorporation of the vulcanisation system was divided into samples of 82,5 g. At a roller temperature of 50° C, 0,5 1,0 or 1,5 g of the additive was blended on a roll mill (roller size: 100 × 200 mm), corresponding to a concentration of 1,0, 2,0 or 3,0 parts to 100 parts of rubber. Two strips measuring 0.5 × 8.0 ins. each weighing about 16 g were cut from these mixtures. The brass-plated steel wire (construction 5 × 0.22 mm, 68.0% copper; NV Bekaert SA) was washed in dichloromethane for 30 minutes shortly before the use and subsequently dried for 20 minutes. The vulcanisation mould was preheated in a hydraulic heating press for at least 3 minutes at 150° C and then filled in the following sequence: brass reinforcing plate (8 inches × 0,5 inch × 0,062 inch), rubber mix. brass-plated steel wire, rubber mix, brass reinforcing plate and cover of the mould. The samples were vulcanised between 25 and/or 35 minutes at 150° C. The individual vulcanisation times resulted form $T_{95}$ of the Monsanto rheometer curves (time taken to attain 95% of the maximum torque) - they were between 5 and 6 minutes plus an allowance of ⅓ $T_{95}$. Upon completion of the vulcanisation, the test samples were removed from the mould and stored at room temperature.

The manufacture of the samples is described in ASTM Test D 2229-73.

(c) Test Method

The test samples were stored at room temperature for 18 to 24 hours. The wires were then pulled out of the rubber block using a universal test machine RK 1000 (Roell & Korthaus KG) in conformity with ASTM Test D 2229-73 and taking into account the modifications described by A. E. Hicks in *Rubber Chemistry and Technology*, 45, pp. 26–48 (1972).

(d) Test Results

The following results were obtained on carrying out the tests by the methods described hereinabove. The pull-out force is the average force that is necessary to pull the wires out of a 1.0 cm thick rubber block and is indicated in kp/cm. The blank value is the average force that is necessary to pull the wires out of a 1.0 cm thick rubber block which contains all mixture components except the additive. The results are given in Table VI.

TABLE VI

Adhesion of SBR to Brass Plated Steel Wire

| A. Additive Compound (Concentration 2%) | Unaged Pull-Out-Force (kp/cm) (Factor) | Aged (7 days/100° C) Pull-Out-Force (kp/cm) (Factor) |
|---|---|---|
| Blank | 3.0 (1.0) | 3.5 (1.0) |
| $H_{35}C_{17}$—C(O)—NH—NH—C(O)—C(O)—NH—NH—C(O)—$C_{17}H_{35}$ | 7.5 (2.5) | 5.5 (1.6) |
| $H_7C_3$—C(O)—NH—NH—C(O)—C(O)—NH—NH—C(O)—$C_6H_5$ | 8.1 (2.7) | 6.0 (1.7) |
| $H_3C$—C(O)—NH—NH—C(O)—$(CH_2)_2$—C(O)—NH—NH—C(O)—$CH_3$ | 8.4 (2.8) | — (—) |
| $H_3C$—C(O)—NH—NH—C(O)—$(CH_2)_4$—C(O)—NH—NH—C(O)—$CH_3$ | 10.9 (3.6) | 6.7 (1.9) |
| Cl—$C_6H_3$(Cl)—C(O)—NH—NH—C(O)—$(CH_2)_8$—C(O)—NH—NH—C(O)—$C_6H_3$(Cl)—Cl | 5.4 (1.8) | 5.0 (1.4) |
| (HO—$C_6H_2(X)_2$—$CH_2CH_2$—C(O)—NH—NH—C(O)—$CH_2CH_2$—$)_2$ | 6.1 (2.0) | 6.0 (1.7) |
| $H_5C_2$—C(O)—NH—NH—C(O)—$C_6H_4$—C(O)—NH—NH—C(O)—$C_2H_5$ | 10.5 (3.5) | 10.1 (2.9) |
| $H_3C$—C(O)—NH—NH—C(O)—NH—NH—C(O)—$CH_3$ | 7.9 (2.6) | 4.3 (1.2) |
| (2-OH-$C_6H_4$)—C(OH)=N—N=C(OH)—(2-OH-$C_6H_4$) | 14.0 (4.7) | 12.3 (3.5) |
| (2-OH-$C_6H_4$)—CH=N—NH—C(O)—C(O)—NH—N=CH—(2-OH-$C_6H_4$) | 8.7 (2.9) | — (—) |
| HO—$C_6H_2(X)_2$—$C_2H_4$—C(O)—NH—$NH_2$ | 4.6 (1.5) | 4.0 (1.1) |
| HO—$C_6H_2(X)_2$—$C_2H_4$—C(O)—NH—NH—C(O)—$C_{17}H_{35}$ | 7.0 (2.3) | 7.2 (2.1) |
| HO—$C_6H_2(X)_2$—$C_2H_4$—C(O)—NH—NH—C(O)—$C_2H_4$—$C_6H_2(X)_2$—OH | 9.3 (3.1) | 7.6 (2.2) |
| HO—$C_6H_2(X)_2$—C(O)—NH—NH—C(O)—$C_6H_2(X)_2$—OH | 5.8 (2.2) | 6.1 (1.7) |
| (OH)(X)_2-$C_6H_2$—C(O)—NH—NH—C(O)—$C_{17}H_{35}$ | 6.1 (2.0) | 5.5 (1.6) |

TABLE VI-continued
Adhesion of SBR to Brass Plated Steel Wire
| A. Additive Compound (Concentration 2%) | Unaged Pull-Out-Force (kp/cm) (Factor) | Aged (7 days/100° C) Pull-Out-Force (kp/cm) (Factor) |
|---|---|---|
| 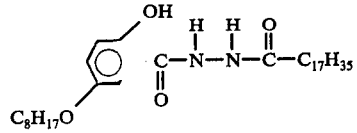 | 10.5 (3.5) | 9.0 (2.6) |
| 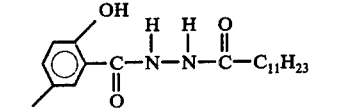 | 11.4 (3.8) | — (—) |
| 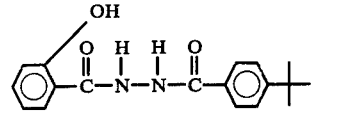 | 16.6 (5.5) | 10.8 (3.1) |
| 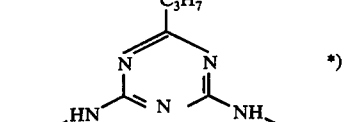 *) | 3.0 (1.0) | 2.9 (0.8) |
| 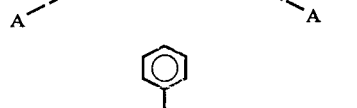 | 5.2 (1.7) | — (—) |
| 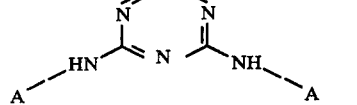 | 5.1 (1.7) | 4.1 (1.2) |
| 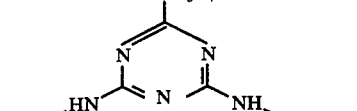 | 7.0 (2.3) | 7.2 (2.1) |
| 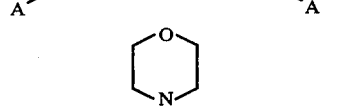 | 7.3 (2.4) | 6.7 (1.9) |
| 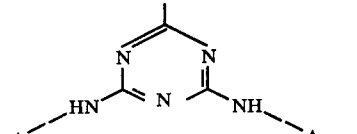 | 9.9 (3.3) | 8.4 (2.4) |
| 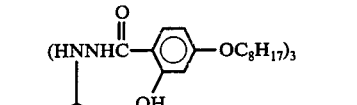 | 5.6 (1.9) | 5.1 (1.5) |
| 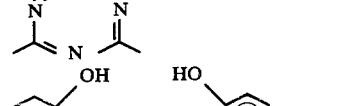 | 6.3 (2.1) | 3.8 (1.1) |

TABLE VI-continued
Adhesion of SBR to Brass Plated Steel Wire

| A. Additive Compound (Concentration 2%) | Unaged Pull-Out-Force (kp/cm) (Factor) | Aged (7 days/100° C) Pull-Out-Force (kp/cm) (Factor) |
|---|---|---|
| CH₃C(O)—N(H)—C₆H₄—C(O)—N(H)—N(H)—C(O)—C₆H₄—N(H)—C(O)CH₃ | 7.5 (2.5) | 6.0 (1.7) |
| (H₃₃C₁₆O)₂C₆H₃—C(O)—N(H)—N(H)—C(O)—C₆H₃(OC₁₆H₃₃)₂ | 4.3 (1.4) | 5.6 (1.6) |
| (HO-C₆H₄)—C(O)—N(H)—N(H)—C(O)—(C₆H₄-OH) | 4.2 (1.4) | 7.0 (2.0) |
| (OH)(H₃C)C₆H₃—C(O)—N(H)—N(H)—C(O)—C(O)—N(H)—N(H)—C(O)—C₆H₃(OH)(CH₃) | 3.2 (1.1) | 4.0 (1.1) |
| (OH)C₆H₄—C(OH)=N—N(H)—C(O)(CH₂)₄C(O)—N(H)—N=C(OH)—C₆H₄(OH) | 2.9 (1.0) | 3.2 (0.9) |
| H₃C—C(O)—N(H)—N(H)—C(O)—CH₃ | 7.0 (2.3) | 4.9 (1.4) |
| H₃₅C₁₇C(O)—N(H)—N(H)—C(O)—C₁₇H₃₅ | 8.1 (2.7) | 5.2 (1.5) |
| (triazine)N—N=C(OH)—N(H)—C(O)(CH₂)₂S(CH₂)₂C(O)—N(H)—C(OH)=N—N(triazine) | 3.1 (1.0) | — (—) |
| (triazine)N—N=C—N(H)—C(O)—C₆H₄—OH | 7.4 (2.5) | 6.1 (1.7) |
| HSCH₂C(O)—N(H)—NH₂ | 6.7 (2.1) | — (—) |
| H₃C—C(=NN(H)C(O)C(O)N(H)N=)C—CH₃ | 2.4 (0.8) | — (—) |
| (C₆H₁₁)=N—N(H)—C(O)—C(O)—N(H)—N=(C₆H₁₁) with H₁₃C₆ substituents | 6.2 (2.1) | — (—) |
| C₆H₅—C(H)=N—N(H)—C(O)—C(O)—N(H)—N=C(H)—C₆H₅ | 2.9 (1.0) | — (—) |
| H₃C(C₆H₅)C=NN—C(O)(CH₂)₇C(O)—NN=C(CH₃)(C₆H₅) | 8.3 (2.8) | — (—) |
| H₁₃C₆C(O)—N(H)—N=(C₆H₁₀) | 6.3 (2.1) | — (—) |
| C₆H₅—C(H)=N—N(H)—C(O)—C(O)—N(H)—N=C(H)—C₆H₅ | 10.0 (3.3) | 9.2 (2.6) |
| H₇C₃C(H)=N—N(H)—C(O)—C(O)—N(H)—N=C(H)—C₃H₇ | 2.7 (0.9) | — (—) |

TABLE VI-continued
Adhesion of SBR to Brass Plated Steel Wire
| A. Additive Compound (Concentration 2%) | Unaged Pull-Out-Force (kp/cm) (Factor) | Aged (7 days/100° C) Pull-Out-Force (kp/cm) (Factor) |
|---|---|---|
| 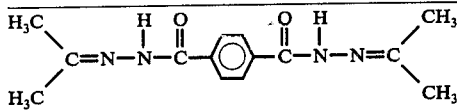 | 4.6 (1.5) | — (—) |
| 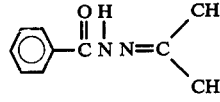 | 6.9 (2.3) | 8.9 (2.5) |
\*) A = 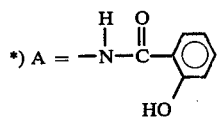
Table VI-B.
| Additive Compound (Concentrations 1, 2 and 4%) | Series | Unaged Pull-Out-Force (kp/cm) (Factor) | | | Aged (7 days/100° C) Pull-Out-Force (kp/cm) (Factor) | | |
|---|---|---|---|---|---|---|---|
| | | 1% | 2% | 4% | 1% | 2% | 4% |
| Blank | 1 | | 3.0 (1.0) | | | 3.5 (1.0) | |
| | 2 | | 3.0 (1.0) | | | 3.5 (1.0) | |
| | 3 | | 2.8 (1.0) | | | 3.8 (1.0) | |
| 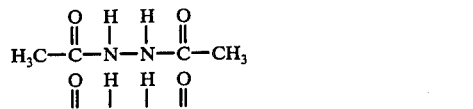 | 2 | 9.1 (3.0) | 11.4 (3.8) | 9.2 (3.1) | 6.2 (1.8) | 9.2 (2.6) | 6.4 |
| 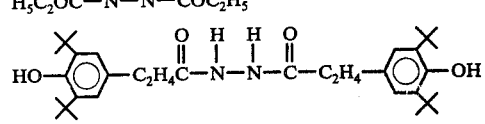 | 1 | | 9.8 (3.2) | | | 6.6 (1.9) | |
|  | 2 | | 15.6 (7.8) | | | 7.0 (2.0) | |
| 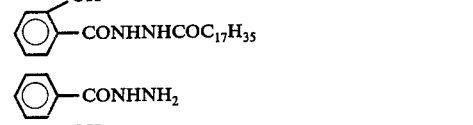 | 2 | | 13.6 (4.5) | | | 10.3 (3.0) | |
|  | 2 | | 11.0 (3.7) | | | 7.2 (2.1) | |
| 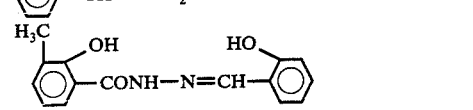 | 3 | | 2.6 (0.9) | | | 3.2 (0.9) | |
| 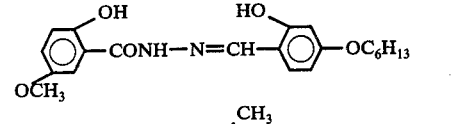 | 3 | | 3.2 (1.1) | | | 3.4 (1.0) | |
| 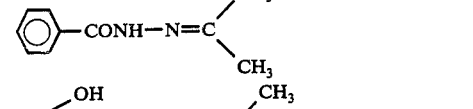 | 3 | | 2.9 (1.0) | | | 3.5 (1.0) | |
| 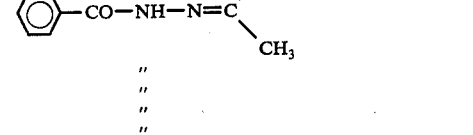 | 2 | | 20.3 (6.8) | | | 10.6 (3.0) | |
|  | 2 | | 7.7 (2.6) | | | 5.3 (1.5) | |
|  | 3 | | 2.3 (0.8) | | | 2.9 (0.8) | |
|  | 1 | 10.8 (3.6) | | | 7.0 (2.0) | | |
| | 2 | 7.1 (2.4) | | | 5.3 (1.5) | | |
| " | 1 | | 5.2 (1.7) | | | 5.5 (1.6) | |
| " | 2 | | 6.8 (2.3) | | | 4.8 (1.4) | |
| " | 1 | | 2.2 (0.7) | | | | 2.2 |
| " | 2 | | 6.3 (2.1) | | | | 6.1 |

Table IV-B.-continued

| Additive Compound (Concentrations 1, 2 and 4%) | Series | Unaged Pull-Out-Force (kp/cm) (Factor) | | | Aged (7 days/100° C) Pull-Out-Force (kp/cm) (Factor) | | |
|---|---|---|---|---|---|---|---|
| | | 1% | 2% | 4% | 1% | 2% | 4% |
| 2-HO-C₆H₄-CONH-N=CH-CH(CH₃)₂ | 3 | | 3.1 (1.0) | | | 2.8 (0.8) | |
| (isopropyl/neopentyl-substituted phenol)-CH-CONH-N=CH-(2-HO-C₆H₄) | 2 | | 4.6 (1.5) | | | 5.5 (1.6) | |
| CH₃(CH₂)₁₂CONHN=C-(CH₂)₁₂CH₃ (with 3-methyl-2-hydroxyphenyl) | 2 | | 8.4 (2.8) | | | 4.7 (1.3) | |
| H₃C-C(O)-NH-NH-C(O)-NH-NH-C(O)-CH₃ | 1 | | 14.1 (4.7) | | | 5.5 (1.6) | |
| H₃₅C₁₇-C(O)-NH-NH-C(O)-NH-NH-C(O)-C₁₇H₃₅ | 3 | | 2.5 (0.8) | | | 3.7 (1.1) | |
| H₃C-C(O)-NH-NH-C(O)-C(O)-NH-NH-C(O)-CH₃ | 1 | | 3.9 (1.3) | | | 4.8 (1.4) | |
| H₃C-C(O)-NH-NH-C(O)-CH₂-C(O)-NH-NH-C(O)-CH₃ | 1 | | 4.9 (1.6) | | | 6.4 (1.8) | |
| H₃C-C(O)-NH-NH-C(O)-(CH₂)₂-C(O)-NH-NH-C(O)-CH₃ | 1 | | 9.4 (3.1) | | | 9.7 (2.8) | |
| H₃C-C(O)-NH-NH-C(O)-(CH₂)₄-C(O)-NH-NH-C(O)-CH₃ | 1 | | 8.4 (2.8) | | | 7.9 (2.2) | |
| H₃C-C(O)-NH-NH-C(O)-(CH₂)₈-C(O)-NH-NH-C(O)-CH₃ | 1 | | 22.3 (7.4) | | | 16.1 (4.6) | |
| (H₃C-C(O)-NH-NH-C(O)-CH₂CH₂)₂S | 1 | | 9.1 (3.0) | | | 7.6 (2.2) | |
| H₇C₃-CH=N-NH-C(O)-C(O)-NH-N=CH-C₃H₇ | 1 | 3.8 (1.3) | | | 6.1 (1.7) | | |
| " | 2 | 3.6 (1.2) | | | 3.5 (1.0) | | |
| " | 1 | | 4.0 (1.3) | | | 3.0 (0.8) | |
| " | 2 | | 3.8 (1.3) | | | 3.2 (0.9) | |
| " | 1 | | | 2.9 (1.0) | | | 2.5 (0.7) |
| " | 2 | | | 2.0 (0.7) | | | 2.4 (0.7) |
| (2-HO-5-CH₃-C₆H₃)-CH=N-NH-C(O)-C(O)-NH-N=CH-(2-HO-5-CH₃-C₆H₃) | 2 | | 6.2 (2.1) | | | 5.5 (1.6) | |
| (biphenyl-OH)-CH=N-NH-C(O)-C(O)-NH-N=CH-(biphenyl-OH) | 2 | | 5.4 (1.8) | | | 3.9 (1.1) | |
| (Cl-,HO-phenyl)-CH=N-NH-C(O)-C(O)-NH-N=CH-(HO-,Cl-phenyl) | 2 | | 8.3 (2.8) | | | 5.2 (1.5) | |
| (CH₃)₂C=NNHCO-C₆H₄-CONHN=C(CH₃)₂ | 1 | 6.7 (2.2) | | | 7.4 (2.1) | | |
| | 2 | 8.6 (2.9) | | | 7.2 (2.1) | | |
| " | 1 | | 6.4 (2.1) | | | 6.2 (1.8) | |
| " | 2 | | 5.5 (1.8) | | | 4.5 (1.3) | |
| " | 1 | | | 12.8 (4.3) | | | 9.8 (2.8) |
| " | 2 | | | 8.2 (2.7) | | | 3.6 (1.0) |
| 2,4-bis(benzoylhydrazino)-6-(diisopropylamino)-1,3,5-triazine | 1 | | 5.8 (1.9) | | | 6.5 (1.9) | |

Table IV-B.-continued

| Additive Compound (Concentrations 1, 2 and 4%) | Series | Unaged Pull-Out-Force (kp/cm) (Factor) | | | Aged (7 days/100° C) Pull-Out-Force (kp/cm) (Factor) | | |
|---|---|---|---|---|---|---|---|
| | | 1% | 2% | 4% | 1% | 2% | 4% |
| (N═══C—NHCOCH$_2$)$_2$S<br>‖   ‖<br>HC   N<br>  \\ N /<br>     \|<br>     H | 2 | | 13.0 (4.3) | | | 9.4 (2.7) | |

EXAMPLE 7

Adhesion of Ethylene-Propylene-Terpolymere (EPDM) to brassplated steel wire (a) Manufacture of EPDM-base mix Recipe:

| EPDM Keltan 520 | 100.0 parts (DSM) |
|---|---|
| Philblack N 550 (carbon black) | 120.0 parts (Philips Petroleum) |
| zinc oxide | 5.0 parts |
| stearic acid | 1.0 parts |
| circosol 42XH (naphtenic oils) | 60.0 parts (Sun Oil Company) |
| sulphur | 1.5 parts |
| Vulkacit Mercapto (accelerator) | 0.6 parts (Bayer) |
| Vulkacit Thiuram (accelerator) | 0.5 parts (Bayer) |
| Robac ZBUD | 2.0 parts (Robinson Brothers Ltd.) |

The mixture was manufactured in a laboratory internal mixer (type LH 1, Werner & Pfleiderer) under the following conditions: bulk factor 1.1, kneading chamber temperature 60° C, speed 70 rpm.

| Mixing plan: | Time (in mins.) |
|---|---|
| 1. mastication of the rubber | 0,5 |
| 2. incorporation of stearic acid, ⅓ carbon black and ⅓ oil | 1,5 |
| 3. incorporation of zinc oxide, ⅓ carbon black and ⅓ oil | 1,5 |
| 4. incorporation of ⅓ carbon black and ⅓ oil | 1,5 |
| 5. final mixing | 0,5 |

The total mixing time was 5.5 minutes and the final temperature of the mixture 150° C.

The blending of the vulcanisation system was carried out on a roll mill type WNU 3 (Troester) (roller size: 200 × 450 mm) at a temperature of 60° C and a friction of 1:1,25 (speed ratio: 20:25).

The mixture obtained from the internal mixer was homogenised for 2 minutes on the roller and the vulcanisation system was then incorporated according to the following mixing cycle:

| | time (in mins.) |
|---|---|
| 1. rolling until formation of sheet on the rolls | 2,0 |
| 2. incorporation of Vulkacit CZ/C and Vulkacit Thiuram | 3,0 |
| 3. 4 times cross blending on both sides | 1,0 |
| 4. incorporation of sulphur | 2,0 |
| 5. 4 times cross blending on both sides, | |

-continued

| | time (in mins.) |
|---|---|
| running 5 times through narrow gap, drawing out sheet | 3,0 |
| total mixing time | 11 minutes |

(b) Manufacture of the test samples

The mixture obtained after incorporation of the vulcanisation system was divided into samples of 87,2 g. At a roller temperature of 60° C, 0,3 0,5 and 1,5 g of the additive was blended on a roll mill (roller size: 100 × 200 mm), corresponding to a concentration of 1,0, 2,0 and 5,0 parts to 100 parts of rubber. Two strips measuring 0,5 × 8,0 ins. and each weighing about 16 g were cut from these mixtures. The brass-plated steel wire (construction 5 × 0.22 mm, 68.0% copper; NV Bekaert SA) was washed in dichloromethane for 30 minutes shortly before the use and subsequently dried for 20 minutes. The vulcanisation mould was preheated in a hydraulic heating press for at least 3 minutes at 160° C and then filled in the following sequence: brass reinforcing plate (8 inches × 0,5 inch × 0.062 inch), rubber mix, brass-plated steel wire, rubber mix, brass reinforcing plate and cover of the mould. The samples were vulcanised for 42 minutes at 160° C. The individual vulcanisation times resulted from T$_{95}$ of the Monsanto rheometer curves (time taken to attain 95% of the maximum torque) - they were between 5 and 6 minutes - plus an allowance of 1/5 T$_{95}$. Upon completion of the vulcanisation, the test samples were removed from the mould and stored at room temperature.

The manufacture of the samples is described in ASTM Test D 2229-73.

(c) Test Method

The test samples were stored at room temperature for 18 to 24 hours. The wires were then pulled out of the rubber block using a universal test machine RK 1000 (Roell & Korthaus KG) in conformity with ASTM Test D 2229-73 and taking into account the modifications described by A. E. Hicks in *Rubber Chemistry and Technology*, 45, pp. 26-48, (1972).

(d) Test Results

The following results were obtained on carrying out the tests by the methods described hereinabove. The pull-out force is the average force that is necessary to pull the wires out of a 1.0 cm thick rubber block and is indicated in kp/cm. The blank value is the average force that is necessary to pull the wires out of a 1.0 cm thick rubber block which contains all mixture components except the additive. The results are given in Table VII.

TABLE VII

Adhesion of EPDM to Brass Plated Steel Wire

| Additive Compound (Concentration 2%) | Unaged Pull-Out-Force (kp/cm) (Factor) | Aged (7 days/100° C) Pull-Out-Force (kp/cm) (Factor) |
|---|---|---|
| Blank | 1.8 (1.0) | 1.8 (1.0) |
| $H_{35}C_{17}-C(=O)-N(H)-N(H)-C(=O)-C(=O)-N(H)-N(H)-C(=O)-C_{17}H_{35}$ | 2.2 (1.2) | 1.8 (1.0) |
| $H_7C_3-C(=O)-N(H)-N(H)-C(=O)-C(=O)-N(H)-N(H)-C(=O)-C_6H_5$ | 2.2 (1.2) | 3.1 (1.7) |
| $H_3C-C(=O)-N(H)-N(H)-C(=O)-(CH_2)_2-C(=O)-N(H)-N(H)-C(=O)-CH_3$ | 2.6 (1.4) | 2.9 (1.6) |
| $H_3C-C(=O)-N(H)-N(H)-C(=O)-(CH_2)_4-C(=O)-N(H)-N(H)-C(=O)-CH_3$ | 3.6 (2.0) | 3.8 (2.1) |
| (2,4-Cl$_2$-C$_6$H$_3$)-C(=O)-N(H)-N(H)-C(=O)-(CH$_2$)$_8$-C(=O)-N(H)-N(H)-C(=O)-(2,4-Cl$_2$-C$_6$H$_3$) | 2.3 (1.3) | 2.4 (1.3) |
| [(HO-3,5-di-t-Bu-C$_6$H$_2$)-CH$_2$CH$_2$C(=O)-N(H)-N(H)-C(=O)-CH$_2$CH$_2$-]$_2$ | 2.5 (1.4) | 2.5 (1.4) |
| $H_5C_2-C(=O)-N(H)-N(H)-C(=O)-C_6H_4-C(=O)-N(H)-N(H)-C(=O)-C_2H_5$ | 2.5 (1.4) | 3.2 (1.8) |
| $H_3C-C(=O)-N(H)-N(H)-C(=O)-N(H)-N(H)-C(=O)-CH_3$ | 2.2 (1.2) | 2.2 (1.2) |
| (2-HO-C$_6$H$_4$)-C(=O)-N(H)-N=C(H)-(2-HO-C$_6$H$_4$) | 6.1 (3.4) | 5.8 (3.5) |
| (2-HO-C$_6$H$_4$)-C(H)=N-N(H)-C(=O)-C(=O)-N(H)-N=C(H)-(2-HO-C$_6$H$_4$) | 1.5 (0.8) | 2.0 (1.1) |
| (HO-3,5-di-t-Bu-C$_6$H$_2$)-C$_2$H$_4$-C(=O)-N(H)-NH$_2$ | 1.4 (0.8) | 1.9 (1.1) |
| (HO-3,5-di-t-Bu-C$_6$H$_2$)-C$_2$H$_4$-C(=O)-N(H)-N(H)-C(=O)-C$_{17}$H$_{35}$ | 3.2 (1.8) | — (—) |
| (HO-3,5-di-t-Bu-C$_6$H$_2$)-C$_2$H$_4$-C(=O)-N(H)-N(H)-C(=O)-C$_2$H$_4$-(3,5-di-t-Bu-4-HO-C$_6$H$_2$) | 3.3 (1.8) | 3.6 (2.0) |
| (HO-3,5-di-t-Bu-C$_6$H$_2$)-C(=O)-N(H)-N(H)-C(=O)-(3,5-di-t-Bu-4-HO-C$_6$H$_2$) | 2.2 (1.2) | 2.5 (1.4) |
| (2-HO-3,5-di-t-Bu-C$_6$H$_2$)-C(=O)-N(H)-N(H)-C(=O)-C$_{17}$H$_{35}$ | 1.8 (1.0) | 1.5 (0.8) |

TABLE VII-continued

Adhesion of EPDM to Brass Plated Steel Wire

| Additive Compound (Concentration 2%) | Unaged Pull-Out-Force (kp/cm) (Factor) | Aged (7 days/100° C) Pull-Out-Force (kp/cm) (Factor) |
|---|---|---|
| 2-hydroxy-5-chlorobenzoyl-lauroyl hydrazide | 2.8 (1.8) | 3.5 (1.9) |
| salicyloyl-benzoyl hydrazide derivative | 3.1 (1.7) | 3.1 (1.7) |
| 2-propyl-4,6-bis(A-amino)-1,3,5-triazine | 3.3 (1.7) | 3.5 (1.9) |
| 2-phenyl-4,6-bis(A-amino)-1,3,5-triazine | 1.9 (1.1) | 2.0 (1.1) |
| 2-propoxy-4,6-bis(A-amino)-1,3,5-triazine | 2.3 (1.3) | 2.3 (1.3) |
| 2-morpholino-4,6-bis(A-amino)-1,3,5-triazine | 2.4 (1.3) | 2.7 (1.5) |
| tris(hydrazide) triazine derivative with $OC_8H_{17}$ | 3.0 (1.7) | 3.3 (1.8) |
| bis(hydroxybenzoyl) hydrazide derivative | 1.9 (1.1) | 1.8 (1.0) |

TABLE VII-continued
Adhesion of EPDM to Brass Plated Steel Wire
| Additive Compound (Concentration 2%) | Unaged Pull-Out-Force (kp/cm) (Factor) | Aged (7 days/100° C) Pull-Out-Force (kp/cm) (Factor) |
|---|---|---|
| 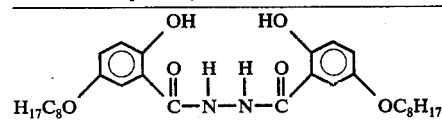 | 2.5 (1.4) | 2.7 (1.5) |
| 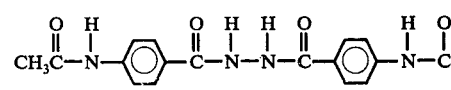 | 2.4 (1.3) | 2.9 (1.6) |
| 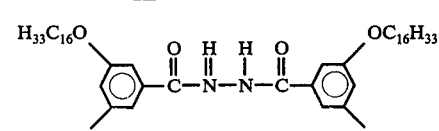 | 2.8 (1.6) | 2.8 (1.6) |
| 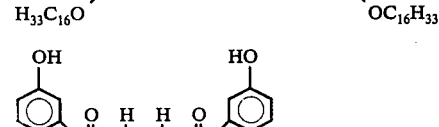 | 1.7 (1.0) | 1.2 (0.7) |
| 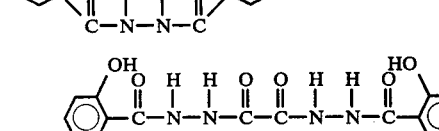 | 2.4 (1.3) | 2.5 (1.4) |
| 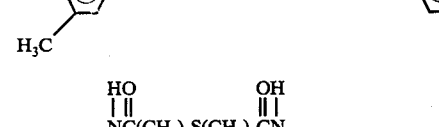 | 2.9 (1.6) | 3.7 (2.1) |
| 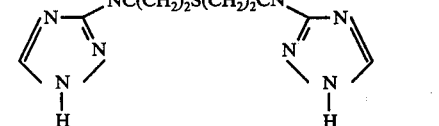 | 1.4 (0.8) | 2.4 (1.3) |
| 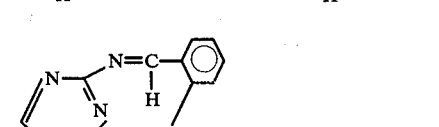 | 2.4 (1.3) | 3.5 (1.9) |
| 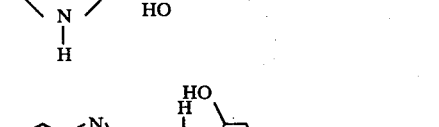 | 2.3 (1.3) | 2.4 (1.3) |
| 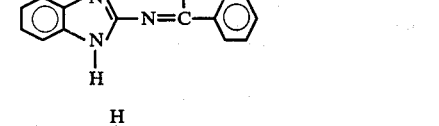 | 6.2 (3.4) | 6.3 (3.5) |
| 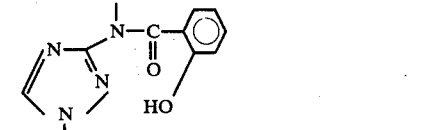 | 5.0 (2.8) | 7.1 (3.9) |
| 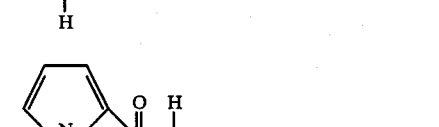 | 5.3 (2.9) | 6.4 (3.6) |

TABLE VII-continued
Adhesion of EPDM to Brass Plated Steel Wire

| Additive Compound (Concentration 2%) | Unaged Pull-Out-Force (kp/cm) (Factor) | Aged (7 days/100° C) Pull-Out-Force (kp/cm) (Factor) |
|---|---|---|
| $H_7C_3C(H)=N-N(H)-C(O)-C(O)-N(H)-N=C(H)-C_3H_7$ | 6.0 (3.3) | 7.5 (4.2) |
| $C_6H_5-C(O)-N(H)-N=C(CH_3)_2$ | 2.5 (1.4) | 3.7 (2.1) |
| *) $A=N(H)-C(O)-C_6H_{10}(OH)$ | | |

EXAMPLE 8
Adhesion of Natural Rubber to Brass-Plated Steel Wire

A natural rubber base mix was prepared as in Example 5(a) using the following recipe:

| | |
|---|---|
| SMR 5L (Standard Malaysion Rubber Grade 5L) | 100.0 parts |
| Philblack N 550 (carbon black) | 60.0 parts (Philips Petroleum) |
| zinc oxide | 5.0 parts |
| stearic acid | 1.0 parts |
| Naftolen ZD (aromatic oil) | 5.0 parts (Metallgesellschaft AG) |
| sulphur | 1.5 parts |
| Vulcazit EMIC | 0.6 parts |
| Sulfasan R | 0.6 parts |
| Vulcasit S (Silicium dioxide) | 15. parts |
| Cohedur RL[1] | 5 parts |

[1]Methylene donor plus resorcinol, Farbenfabrick Bayer, A.G.

The Vulcazit EMIC and Sulfasan R were incorporated in the same manner as were Vulkacit CZ/C and Vulkacit Thiuram in Example 5(a). The Vulcasit S was added together with the carbon black. Cohedur RL was added as the last ingredient at the end of the total mixing cycle during a time approximately 4 minutes.

The test samples were manufactured and tested in accordance with Example 5(b) and 5(c), the additive compound being incorporated in the concentrations (parts per 100 parts of rubber) shown in the following Table VIII. The following results were obtained on carrying out the tests by the methods described hereinabove. The pull-out force is the average force that is necessary to pull the wires out of a 1.0 cm thick rubber block and is indicated in kp/cm. The blank value is the average force that is necessary to pull the wires out of a 1.0 cm thick rubber block which contains all mixture components except the additive. The results are given in Table VIII.

Table VIII
Adhesion of SBR to Brass-Plated Steel Wire

| Additive Compound | Concentration % | Unaged Pull-Out Force (kp/cm) | Aged (7) days/100° C) Pull-Out-Force (kp/cm) |
|---|---|---|---|
| Blank | | 19 | 6 |
| salicyloyl-salicylidene-hydrazide | 1.0 | 29 | 9 |
| N,N'-di-acetyladipic acid dihydrazide | 2.0 | 27 | 8 |
| distearoylhydrazide | 1.0 | 24 | 8 |

EXAMPLE 9
Adhesion of Styrene Butadiene-Copolymer (SBR) to Brass-Plated Steel Wire An SBR rubber base mix was prepared as in Example 6(a) using the following recipe:

| | |
|---|---|
| Buna Hiils S1502 | 100.0 parts (Chemische Werke Hiils) |
| Philblack N 550 (carbon black) | 50.0 parts (Philips Petroleum) |
| zinc oxide | 5.0 parts |
| stearic acid | 2.0 parts |
| Naftolen ZD (aromatic oil) | 5.0 parts (Metallgesellschaft AG) |
| sulphur | 1.75 parts |
| Vulkacit NZ (accelerator) | 1.0 parts (Bayer) |
| Vulkasit Thiuran (acelerator) | 0.2 parts (Bayer) |
| Vulcasit S | 15. parts |
| Cohedur RL[1] | 5. parts |

[1]Methylene donor plus resorcinol, Farbenfabrick Bayer, A.G.

The Vulcasit S was added together with the carbon black. Cohedur RL was added as the last ingredient at the end of the total mixing cycle during a time of approximately 4 minutes.

The test samples were manufactured and tested in accordance with Example 6(b) and 6(c), the additive compounds being incorporated in the concentrations (parts per 100 parts of rubber) shown in the following Table IX. The following results were obtained on carrying out the tests by the methods described hereinabove. The pull-out force is the average force that is necessary to pull the wires of a 1.0 cm thick rubber block and is indicated in kp/cm. The blank value is the average force that is necessary to pull the wires out of a 1.0 cm thick rubber block which contains all mixture components except the additive. The results are given in Table IX.

Table IX

Adhesion of SBR to Brass-Plated Steel Wire

| Additive Compound | Concentration % | Unaged Pull-Out-Force (kp/cm) | Aged (7 days/100° C) Pull-Out-Force (kp/cm) |
|---|---|---|---|
| Blank | | 35 | 21 |
| salicyloyl-salicylidene-hydrazide | 2.0 | 36 | 31 |
| N,N'-di-acetyl-adipic acid dihydrazide | 2.0 | 36 | 24 |

What is claimed is:

1. A method of improving adhesion between a vulcanizable elastomeric composition and a metal surface to provide a strong and durable bond, which method comprises (a) adding to a vulcanizable elastomeric composition a methylene acceptor and a methylene donor reactable therewith, and from 0.05 percent to 10 percent by weight based on the weight of the elastomer of a metal deactivating compound of the formula

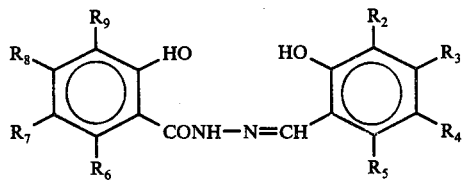

wherein $R_2$, $R_3$, $R_4$, $R_5$, $R_6$, $R_7$, $R_8$, and $R_9$ are each independently hydrogen, lower alkyl, lower alkoxy, or a phenyl group, and (b) vulcanizing the composition while it is in contact with the metal surface.

2. The method of claim 1 wherein the vulcanizable elastomer is selected from polybutadiene, polyisoprene, or a blend of natural rubber with (a) styrene-butadiene copolymer, (b) polybutadiene, (c) polyisoprene, or (d) unsaturated ethylene-propylene interpolymer, or a ternary blend of any of the above polymers.

3. A method of claim 1 wherein the methylene acceptor and methylene donor consists essentially of hexamethylenetetramine and resorcinol.

4. A method of claim 3 wherein the vulcanizable elastomer is selected from polybutadiene, polyisoprene, or a blend of natural rubber with (a) styrene-butadiene copolymer, (b) polybutadiene, (c) polyisoprene, or (d) unsaturated ethylene-propylene interpolymer, or a ternary blend of any of the above polymers.

5. A method of claim 1 wherein the methylene acceptor and methylene donor consists essentially of a melamine and resorcinol.

6. A method of claim 5 wherein said melamine is selected from dimethylolmelamine, tri-methylolmelamine, partially etherified trimethylolmelamine, fully etherified hexamethylolmelamine, and fully etherified tetra-methylolenzoquanamine.

* * * * *